US012780582B2

(12) United States Patent
Haraguchi

(10) Patent No.: US 12,780,582 B2
(45) Date of Patent: Nov. 3, 2026

(54) TRANSPORT GUIDE DRIVE MECHANISM, PAPER SHEET TRANSPORT DEVICE, METHOD FOR CONTROLLING PAPER SHEET TRANSPORT DEVICE, AND PAPER SHEET HANDLING DEVICE

(71) Applicant: JAPAN CASH MACHINE CO., LTD., Osaka (JP)

(72) Inventor: Kohei Haraguchi, Osaka (JP)

(73) Assignee: JAPAN CASH MACHINE CO., LTD., Osaka (JP)

( * ) Notice: Subject to any disclaimer, the term of this patent is extended or adjusted under 35 U.S.C. 154(b) by 124 days.

(21) Appl. No.: 18/836,239

(22) PCT Filed: Jan. 24, 2023

(86) PCT No.: PCT/JP2023/002128

§ 371 (c)(1),
(2) Date: Apr. 8, 2025

(87) PCT Pub. No.: WO2023/162553

PCT Pub. Date: Aug. 31, 2023

(65) Prior Publication Data

US 2025/0388425 A1 Dec. 25, 2025

(30) Foreign Application Priority Data

Feb. 28, 2022 (JP) ................................ 2022-029786

(51) Int. Cl.
*G07D 11/17* (2019.01)
*B65H 29/12* (2006.01)
(Continued)

(52) U.S. Cl.
CPC ........... *B65H 29/52* (2013.01); *B65H 29/125* (2013.01); *B65H 43/00* (2013.01); *F16D 3/12* (2013.01);
(Continued)

(58) Field of Classification Search
CPC ...... B65H 29/52; B65H 29/125; B65H 43/00; B65H 2301/331; B65H 2301/44318;
(Continued)

(56) References Cited

U.S. PATENT DOCUMENTS 3,359,819 A * 12/1967 Veillette .................. F16H 55/18 74/411
3,443,449 A * 5/1969 Kotarski ................. F16H 19/04 74/411
(Continued)

FOREIGN PATENT DOCUMENTS

CN 102142164 A 8/2011
CN 103778708 A 5/2014
(Continued)

OTHER PUBLICATIONS

Office Action issued in Taiwanese Application No. 112104799; Dated Nov. 2, 2023 (5 pages).
(Continued)

*Primary Examiner* — Thomas A Morrison
(74) *Attorney, Agent, or Firm* — Osha Bergman Watanabe & Burton LLP

(57) ABSTRACT

The present invention provides a transport guide drive mechanism that corrects the transport state in a paper sheet transport device including a wide transport surface that can be used in common for paper sheets with different width dimensions, to a normal state while preventing a deformation or a damage of the paper sheets during continuous and unintermittent transport. The transport guide drive mechanism includes transport guides 310 that are arranged along both side edges of a transport surface 11 in a width direction to oppose each other and that respectively guide both side edges of a paper sheet to be transported, an advancing/retreating mechanism 350 that causes the transport guides to synchronously protrude and retract in a predetermined direc-
(Continued)

tion, stoppers 440 each of which defines a protruded position where an associated one of the transport guides 310 is most protruded from the transport surface 11 and a retracted position retracted from the protruded position toward the transport surface, and a DC motor 450 that drives the advancing/retreating mechanism 350.

11 Claims, 16 Drawing Sheets

(51) Int. Cl.

| | |
|---|---|
| ***B65H 29/52*** | (2006.01) |
| ***B65H 43/00*** | (2006.01) |
| ***F16D 3/12*** | (2006.01) |
| ***F16D 3/66*** | (2006.01) |
| ***F16H 19/04*** | (2006.01) |

(52) U.S. Cl.

CPC ............... *F16D 3/66* (2013.01); *F16H 19/04* (2013.01); *G07D 11/17* (2019.01); *B65H 2301/331* (2013.01); *B65H 2301/44318* (2013.01); *B65H 2301/446* (2013.01); *B65H 2403/41* (2013.01); *B65H 2404/7412* (2013.01); *B65H 2404/743* (2013.01); *B65H 2701/1131* (2013.01); *B65H 2701/1912* (2013.01); *G07D 2211/00* (2013.01)

(58) Field of Classification Search

CPC .......... B65H 2301/446; B65H 2403/41; B65H 2404/7412; B65H 2404/743; B65H 2701/1131; B65H 2701/1912; B65H 2511/10; G07D 11/17; G07D 2211/00; F16D 3/12; F16D 3/66; F16H 19/04

USPC .......................................................... 271/171

See application file for complete search history.

(56) References Cited

U.S. PATENT DOCUMENTS

| | | | | | |
|---|---|---|---|---|---|
| 5,791,190 | A * | 8/1998 | Konno | A63H 31/00 74/411 |
| 5,934,144 | A * | 8/1999 | Marinkovic | F16H 55/18 74/411 |
| 6,073,925 | A * | 6/2000 | Sato | B65H 31/20 271/223 |
| 7,976,017 | B2 * | 7/2011 | Shiohara | B65H 1/266 271/171 |
| 8,794,623 | B2 * | 8/2014 | Matsumoto | B65H 7/00 271/223 |
| 8,814,162 | B2 | 8/2014 | Suzuki | |
| 8,899,123 | B2 * | 12/2014 | Lai | F16H 55/14 74/411 |
| 2006/0214363 | A1 | 9/2006 | Kawashima et al. | |
| 2007/0000752 | A1 | 1/2007 | Yoshioka | |
| 2007/0025746 | A1 | 2/2007 | Hayashi et al. | |
| 2012/0038099 | A1 | 2/2012 | Karasawa et al. | |

FOREIGN PATENT DOCUMENTS

| | | | |
|---|---|---|---|
| CN | 209682307 | * | 11/2019 |
| EA | 009271 | B1 | 12/2007 |
| JP | S62151465 | U | 9/1987 |
| JP | 2002012342 | A | 1/2002 |
| JP | 2002362785 | A | 12/2002 |
| JP | 2006264793 | A | 10/2006 |
| JP | 2018205991 | A | 12/2018 |
| JP | 6855329 | B2 | 4/2021 |
| RU | 2474880 | C1 | 2/2013 |
| SU | 897105 | A3 | 1/1982 |
| TW | 200705322 | A | 2/2007 |

OTHER PUBLICATIONS

International Search Report issued in International Application No. PCT/JP2023/002128, mailed Apr. 18, 2023 (5 pages).

Written Opinion issued in International Application No. PCT/JP2023/002128; Dated Apr. 18, 2023 (4 pages).

Office Action issued in Russian Application No. 2024116099, mailed Nov. 13, 2024 (11 pages).

Extended European Search Report issued in counterpart European Application No. 23759559.0 mailed on Feb. 19, 2026 (25 pages).

* cited by examiner (a)

(b)

(a)

(b)

(a)

(b)

(a)

(b)

(a)

(b)

TRANSPORT GUIDE DRIVE MECHANISM, PAPER SHEET TRANSPORT DEVICE, METHOD FOR CONTROLLING PAPER SHEET TRANSPORT DEVICE, AND PAPER SHEET HANDLING DEVICE

FIELD

The present invention relates to a mechanism, in a paper sheet transport device that transports paper sheets such as banknotes, which drives transport guides correcting or eliminating a transport failure related to the transport position or the like of a paper sheet.

BACKGROUND

In a banknote transport device installed in a variety of vending machines, a change machine, a cash dispenser, and other various types of banknote handling devices that receive an input banknote and provide goods or services for a user, a centering device or a skew correcting device that corrects a transport failure, such as misalignment from the central axis of a transport passage or skew of a banknote input with a short edge in the lead to normal position and attitude is incorporated.

A centering device and a skew correcting device correct the transport position or the transport attitude of a banknote on a transport passage to a state appropriate for reading or determination by a recognition device located downstream. The centering device and the like prevent complication of various types of processing at subsequent stages due to a misaligned state of banknotes stacked in a cashbox that is located downstream from the recognition device, for example, complication of an aligning operation prior to setting of a batch of banknotes in a sorter or a counting device, and also prevent occurrence of jam when a batch of misaligned banknotes is set in a sorter or the like to be subjected to processing.

Next, banknotes issued in various countries in the world are broadly divided into narrow banknotes where the maximum size (the maximum width dimension) of the short side is less than 72 millimeters (mm), such as those in the USA, Canada, and Australia, and wide banknotes where the maximum width dimension is equal to or more than 72 mm and less than 86 mm, such as those in Japan, the Eurozone, and Macau.

However, when a manufacturer of banknote transport devices manufactures banknote transport devices for countries in which the narrow banknotes circulate and other countries in which the wide banknotes circulate, it is disadvantageous to manufacture devices having different specifications according to the countries. That is, it is apparently disadvantageous in terms of increase in the manufacturing cost, inventory control cost, and the like, to prepare two types of banknote transport devices that have no structural differences other than the difference in the width of the transport path and to manufacture and ship one of the types according to orders.

In order to address the disadvantage and inconvenience described above, measures to prepare only one type of device including a wide transport path that enables a wide banknote to be transported, and use the device in common for narrow banknotes are adopted. Particularly, in a case in which an image sensor is used as means for recognizing the denomination, the authenticity, or the like of a banknote, high-accuracy recognition can be performed even when the transport attitude or position of a banknote fluctuates and accordingly a centering or skew correcting function has not been required even when narrow banknotes are transported. However, if narrow banknotes are consecutively transported without correction of the transport position or modification of the attitude, the banknotes are in a considerably misaligned state when accumulated and stored in a cashbox. Unless a batch of banknotes taken out from the cashbox is manually arranged at a certain level of alignment or higher, jam occurs and causes an unprocessable state when the batch is set in a sorter or a counter at the subsequent stage to perform processing. Accordingly, the labor to align the banknotes leads to a non-negligible degree of increase in the work and becomes a cause of a significant decrease in operation efficiency.

Therefore, in order to enable a banknote transport device including a wide transport path to transport a narrow banknote along a certain trajectory, transport guides corresponding to a narrow banknote are conventionally attached and fixed along both sidewalls of the wide transport path to enable widthwise shifting and skew correction. That is, only one type of banknote transport device including a wide transport surface that can transport a wide banknote is prepared to use this banknote transport device in countries where wide banknotes are used while, in order to address countries where narrow banknotes are used, the transport guides for a narrow banknote are attached and fixed to oppose both side edges of the transport surface for a wide banknote of the same device. By fixing the transport guides for a narrow banknote in a state opposing the both side edges of the wide transport surface, the both side edges in the width direction of a narrow banknote passing between the transport guides can be widthwise shifted toward the central axis of the transport surface.

However, in practice, an operation to attach the transport guides for a narrow banknote has been a cause to decrease the productivity, and improvement in this point has been demanded.

Although the transport guides for a narrow banknote effectively function at the time of receiving transport, the transport guides become a factor of a trouble of a transport failure when the banknote is determined to be unacceptable by a recognition device on a downstream side and a return operation is performed. That is, a trouble is reported, in which a narrow banknote having been determined to be unacceptable during transport hits the narrow banknote transport guides in the course of reverse transport for returning and causes jam, and the operability of the device is decreased.

In Patent Literature 1, as a banknote transport device that is adaptable in common to banknotes having different width dimensions, a pair of movable pieces are installed along the width direction of a transport path to be capable of synchronously advancing or retreating by an equal distance in order to widthwise shift banknotes input and transported one by one to the central axis of the transport path in the width direction. In an initial state, the movable pieces are at standby positions most separated. At the time of widthwise shifting, a widthwise shifting operation of moving the movable pieces toward the central axis by a force of a spring to align the central axis of a banknote with the central axis of the transport path in a state in which the transport of the banknote is temporarily stopped is performed. After the movable pieces are completely opened by motor gear driving, the transport is resumed and the recognition is performed at a high accuracy.

However, there are a problem of increase in the processing time because the transport needs to be temporarily stopped during the widthwise shifting operation of each banknote and a problem of increase in the number of components and upsizing of each component.

CITATION LIST

Patent Literature

Patent Literature 1: Japanese Patent No. 6855329

SUMMARY

Technical Problem

The present invention has been made in view of the above circumstances, and has an object to provide a transport guide drive mechanism, a paper sheet transport device, and a paper sheet handling device that can correct paper sheets inserted from various positions or angles to a normal transport state while continuously transporting the paper sheets without interruption, can handle paper sheets having different width dimensions in common, and can prevent transport guides from becoming a cause of jam at the time of returning a paper sheet.

Solution to Problem

In order to achieve the above object, a transport guide drive mechanism according to the present invention comprises: a transport surface that guides one surface of a paper sheet; transport guides that are arranged along both side edges of the transport surface in a width direction to oppose each other and that respectively guide both side edges of the paper sheet to be transported; an advancing/retreating mechanism that causes the transport guides to synchronously advance and retreat in a predetermined direction; stoppers each of which defines a protruded position where an associated one of the transport guides is most protruded from the transport surface and a retracted position retracted from the protruded position toward the transport surface; and a DC motor that drives the advancing/retreating mechanism, wherein the advancing/retreating mechanism includes a gear mechanism that is driven by the DC motor to cause each of the transport guides to advance and retreat between the protruded position and the retracted position, and an inertia absorption mechanism that absorbs and reduces inertia moment of the DC motor transmitted from an output shaft of the DC motor to the gear mechanism when the DC motor stops at a timing the transport guides are stopped at each of the protruded position and the retracted position by the stoppers.

Advantageous Effects of Invention

The present invention can provide a technique of correcting the transport state in a paper sheet transport device including a wide transport surface (a transport path) that can be used in common for paper sheets with different width dimensions, to a normal state while preventing a deformation or a damage of the paper sheets during continuous and unintermittent transport.

DESCRIPTION OF EMBODIMENTS

Figure 1:
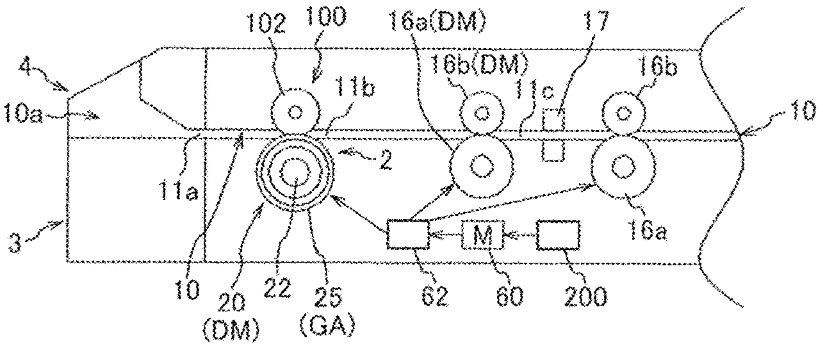
FIG. 1 is a lateral vertical sectional view illustrating in a simplified manner a paper sheet transport path and a friction transport device of a paper sheet transport device including a transport guide drive mechanism according to one embodiment of the present invention.

The present invention will be described below in detail with embodiments illustrated in the drawings.

[Basic Configuration and Operation Principle of Banknote Transport Device]

A basic configuration and an operation principle of a banknote transport device including a transport guide drive mechanism of the present invention are explained below.

Figure 2:
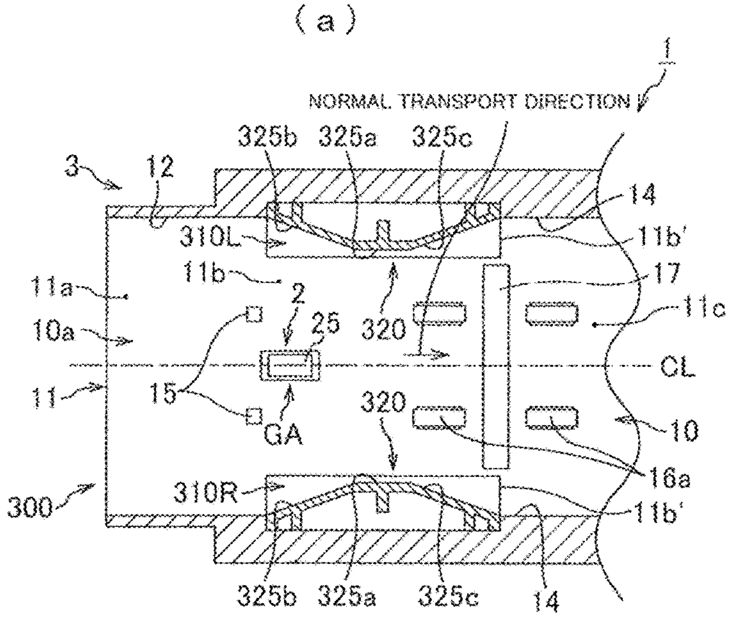
FIGS. 2(*a*) and 2(*b*) are schematic plan views of a lower unit with a portion thereof illustrated in section.
Figure 2:
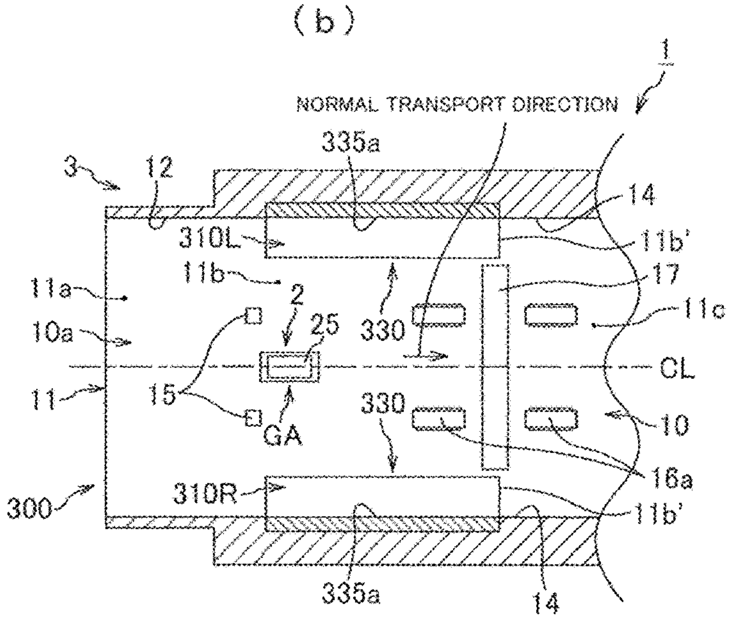

FIG. 1 is a lateral vertical sectional view illustrating in a simplified manner a paper sheet transport path and a friction transport device of a paper sheet transport device including the transport guide drive mechanism according to one embodiment of the present invention, and FIGS. 2(*a*) and 2(*b*) are schematic plan views of a lower unit with a portion thereof illustrated in section.

Figure 3:
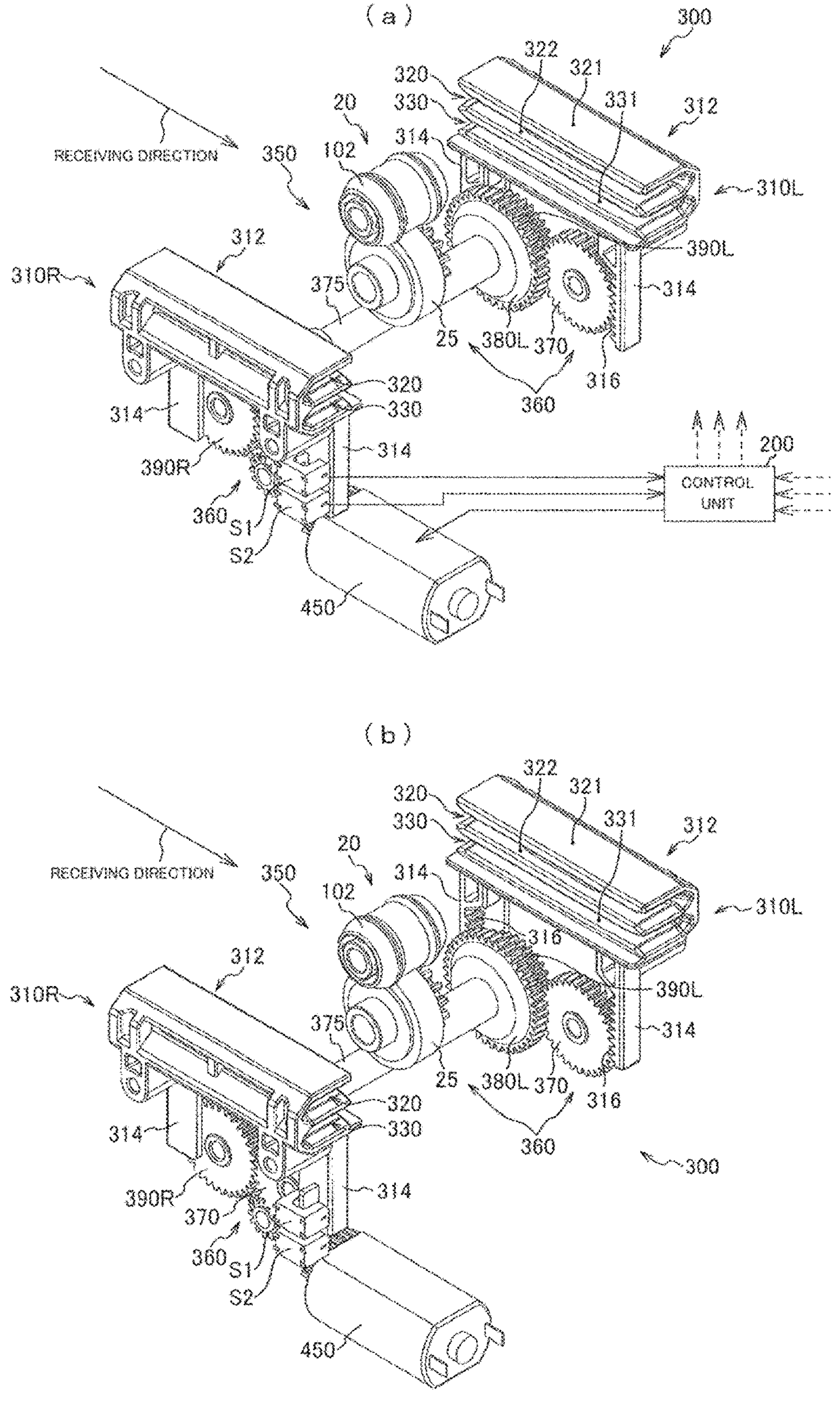
FIGS. 3(*a*) and 3(*b*) are perspective views illustrating one example of the transport guide mechanism.
Figure 4:
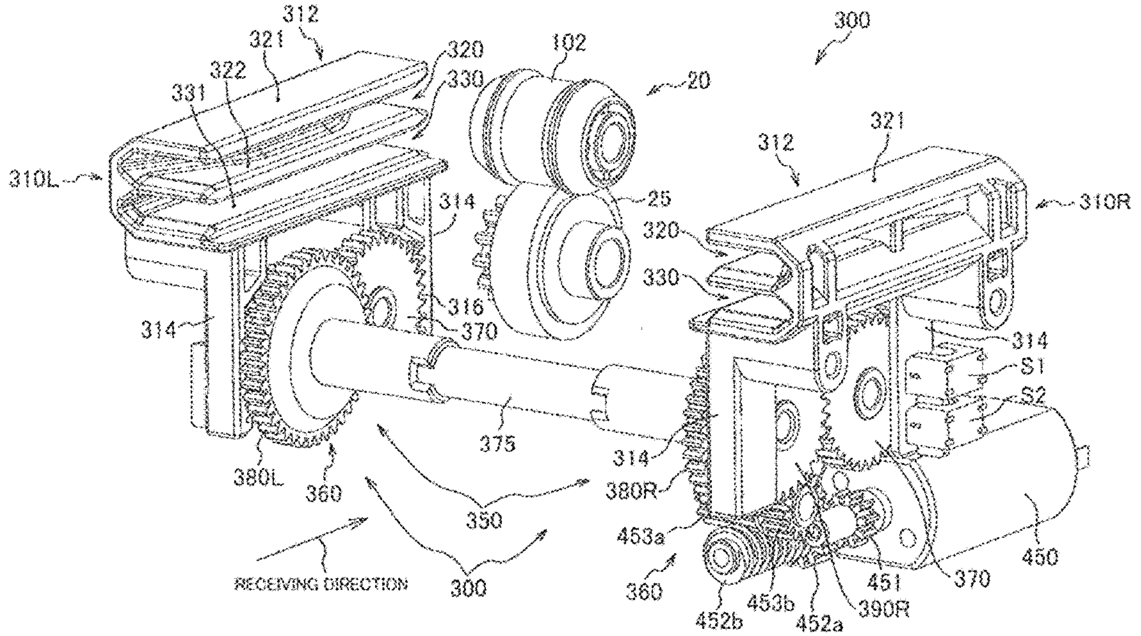
FIGS. 4(*a*) and 4(*b*) are other perspective views illustrating one example of the transport guide mechanism.
Figure 4:
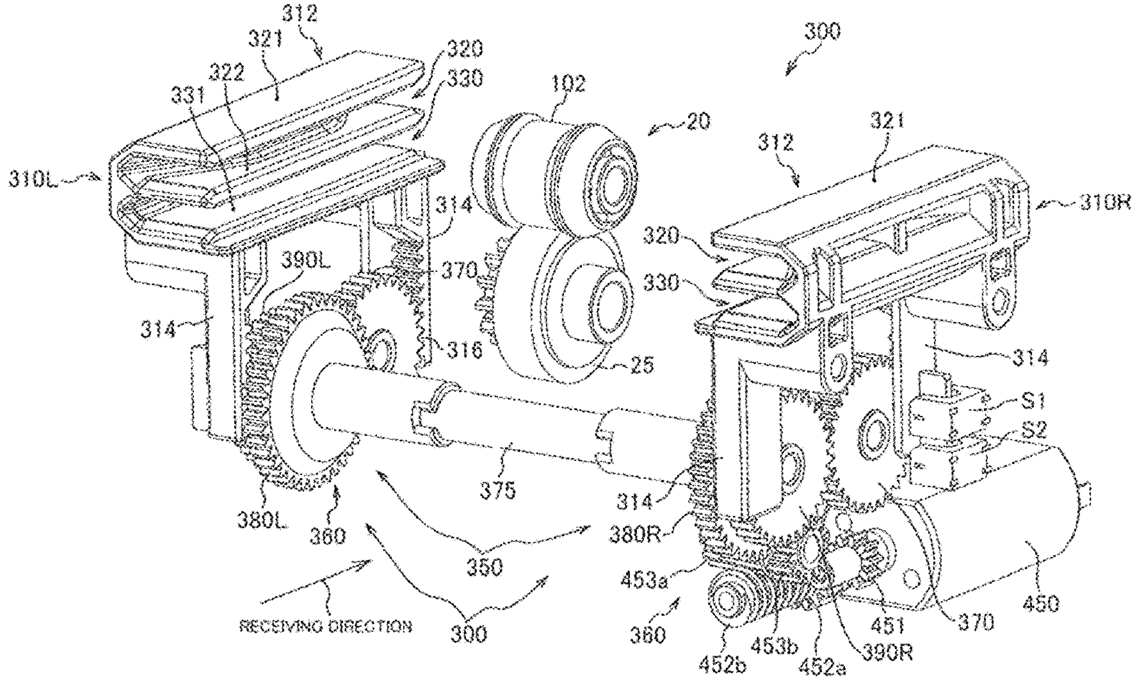
Figure 5:
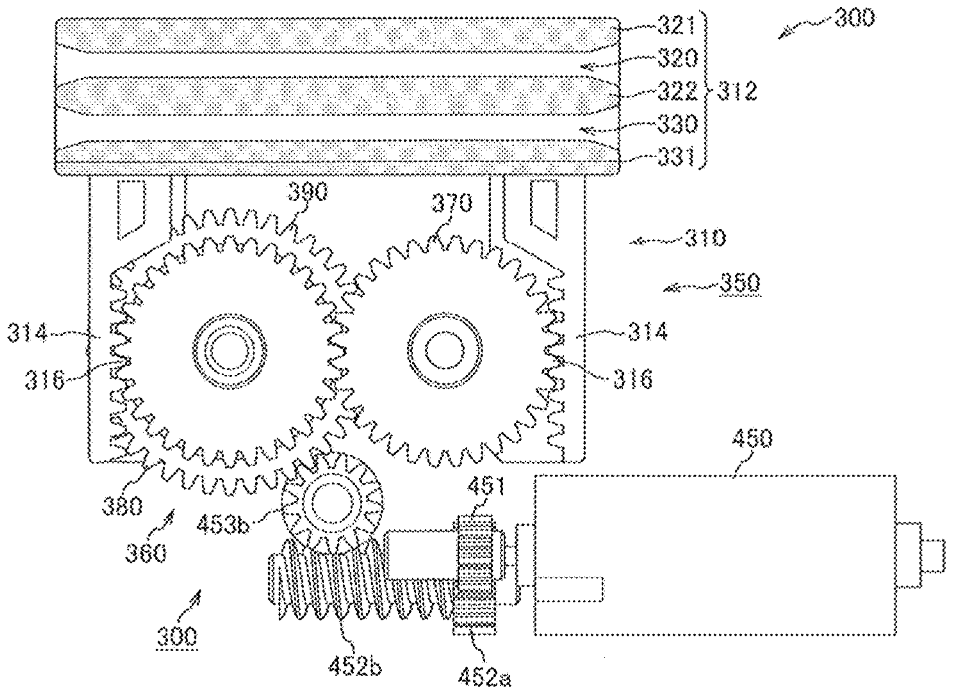
FIGS. 5(*a*) and 5(*b*) are side views illustrating a configuration of the transport guide mechanism.
Figure 5:
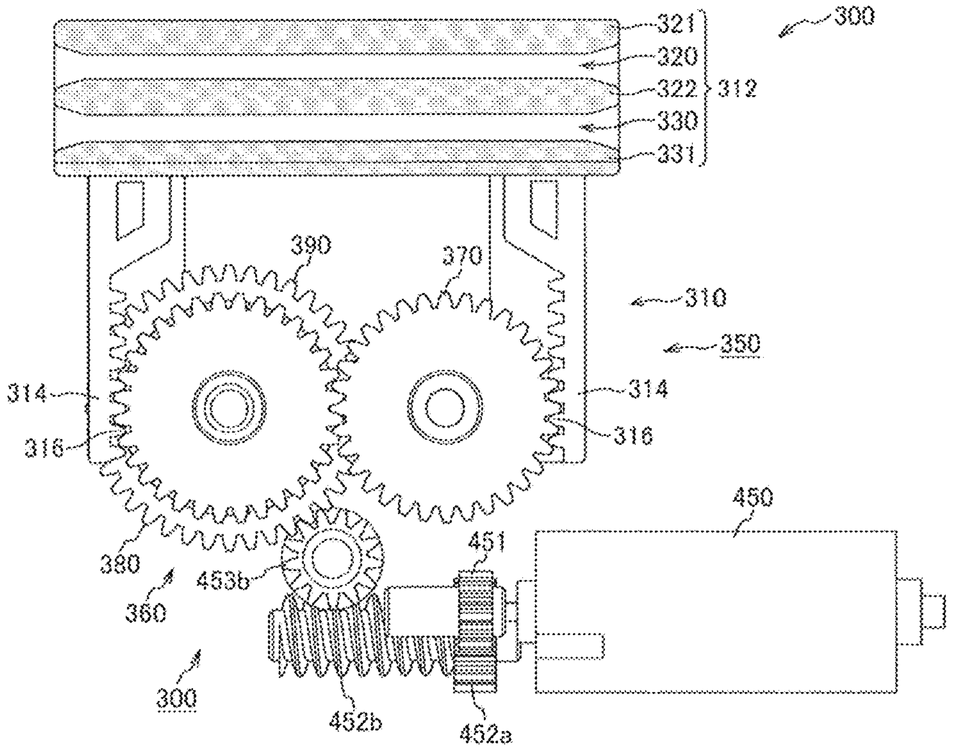
Figure 6:
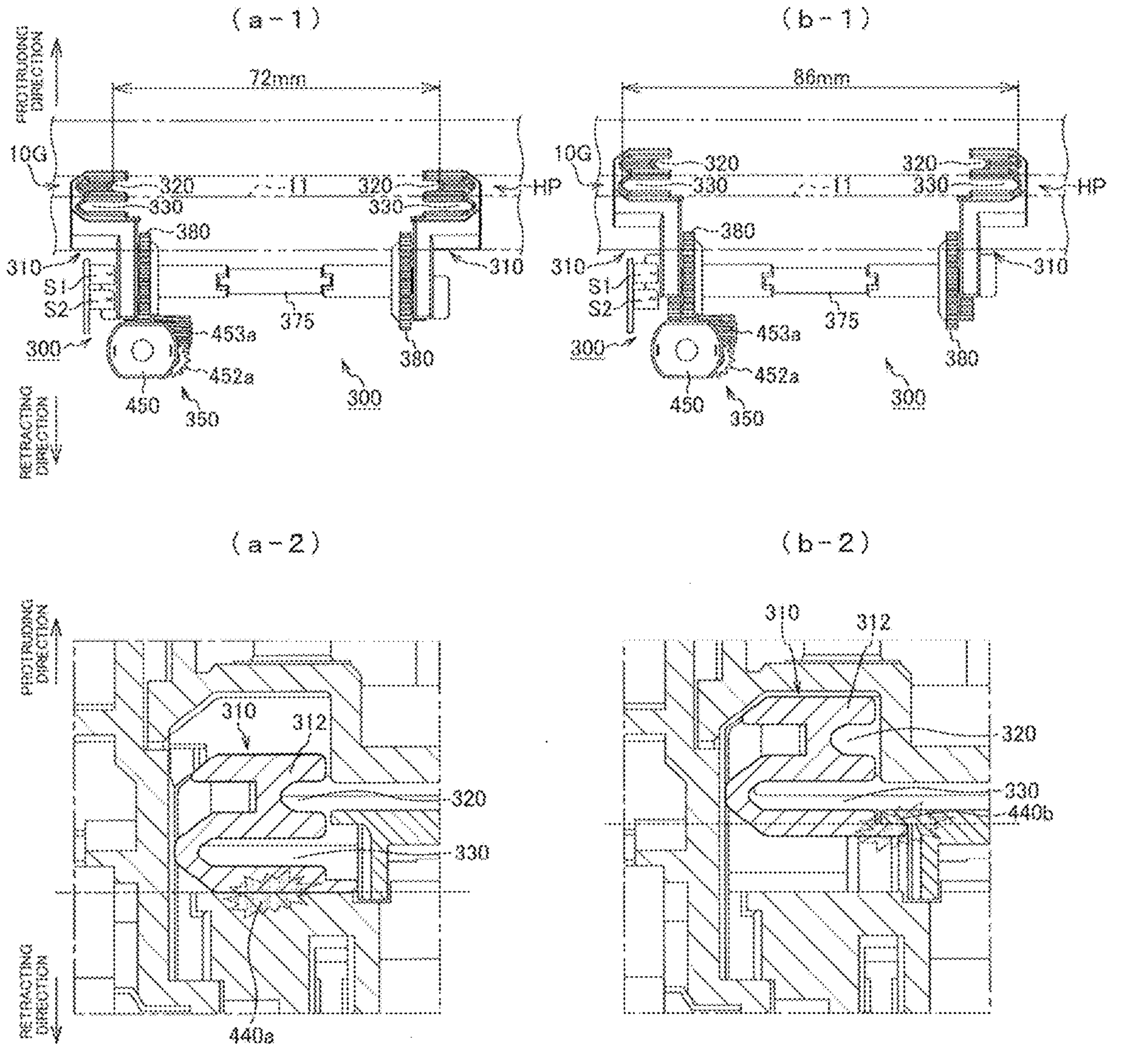
FIG. 6(*a*-1) and 6(*a*-2) are respectively a front view at a time when transport guides are at a most lowered position and a sectional view near a lowering stopper, and FIG. 6(*b*-1) and 6(*b*-2) are respectively a front view at a time when the transport guides are at a most lifted position and a sectional view near a lifting stopper.
Figure 7:
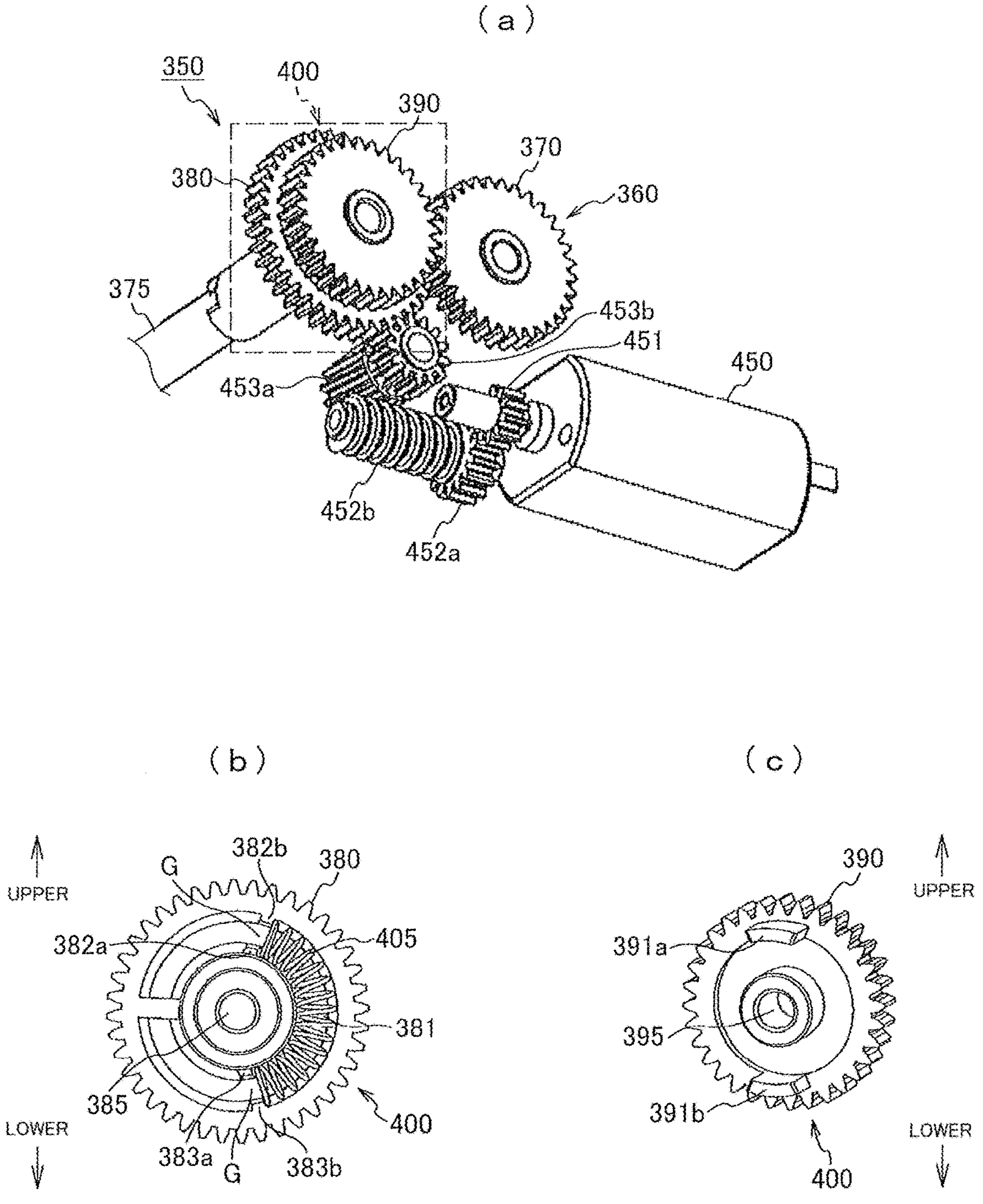
FIG. 7(*a*) is a perspective view illustrating a partial configuration of an advancing/retreating mechanism including an inertia absorbing mechanism, FIG. 7(*b*) is a configuration diagram of one side of a drive-side gear, and FIG. 7(*c*) is a configuration diagram of one side of an intermediate gear.
Figure 8:
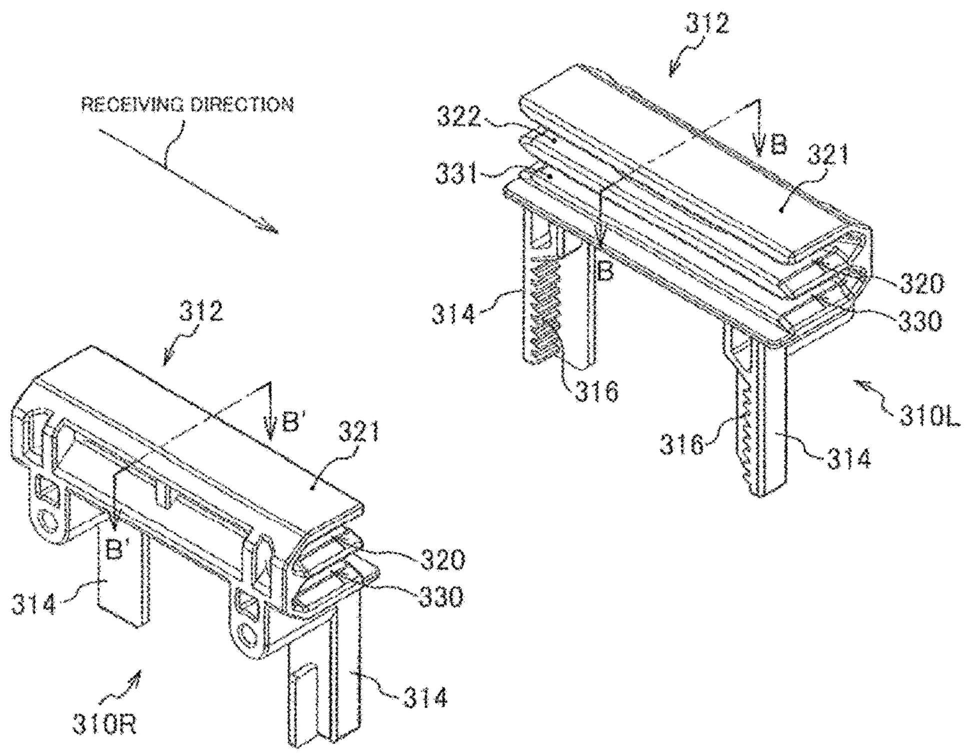
FIG. 8(*a*) is a perspective view illustrating one example of a configuration of two transport guides, and FIG. 8(*b*) is a sectional view along a line B-B and a line B'-B' in FIG. 8(*a*).
Figure 8:
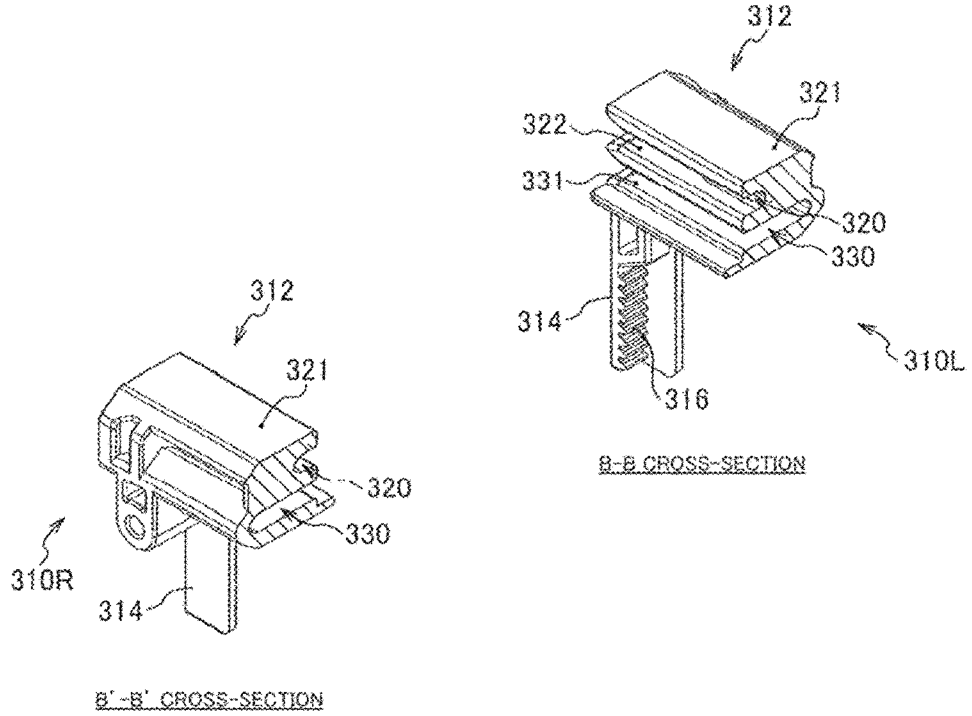
Figure 9:
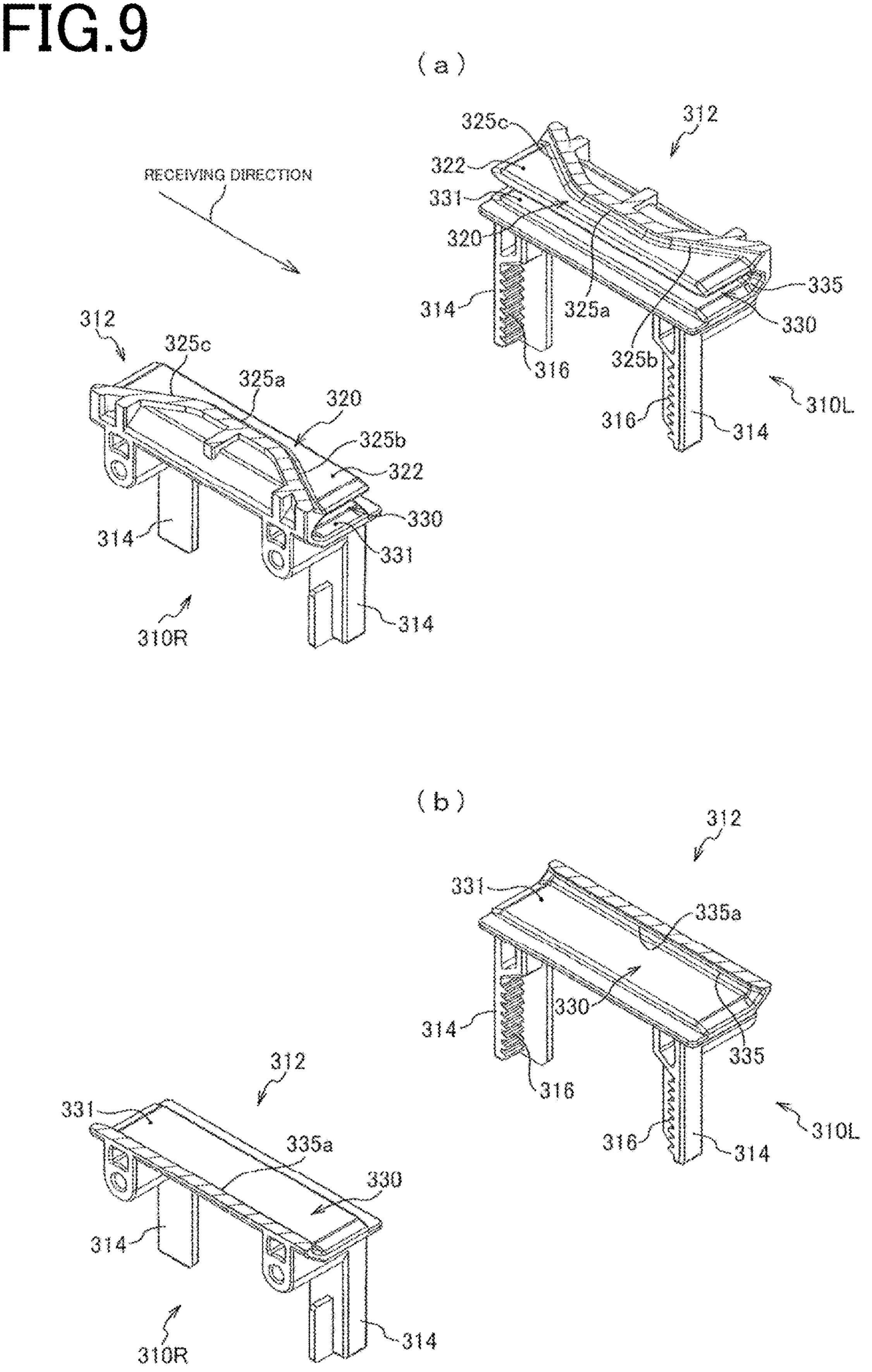
FIG. 9(*a*) is a perspective view of the transport guides, illustrating narrow banknote guide parts in transverse section, and FIG. 9(*b*) is a perspective view of the transport guides, illustrating wide banknote guide parts in transverse section.

FIGS. 3(*a*) and 3(*b*) are perspective views illustrating one example of the transport guide mechanism, FIGS. 4(*a*) and 4(*b*) are other perspective views illustrating one example of the transport guide mechanism, FIGS. 5(*a*) and 5(*b*) are side views illustrating a configuration of the transport guide mechanism, FIGS. 6(*a*-1) and 6(*a*-2) are respectively a front view at a time when transport guides are at a most lowered position and a sectional view near a lowering stopper, FIGS. 6(*b*-1) and 6(*b*-2) are respectively a front view at a time when the transport guides are at a most lifted position and a sectional view near a lifting stopper, FIG. 7(*a*) is a perspective view illustrating a partial configuration of an advancing/retreating mechanism including an inertia absorbing mechanism, FIG. 7(*b*) is a configuration diagram of one side of a drive-side gear, FIG. 7(*c*) is a configuration diagram of one side of an intermediate gear, FIG. 8(*a*) is a perspective view illustrating one example of the configuration of two transport guides, FIG. 8(*b*) is a sectional view along a line B-B and a line B'-B' in FIG. 8(*a*), FIG. 9(*a*) is a perspective view of the transport guides, illustrating narrow banknote guide parts in transverse section, and FIG. 9(*b*) is a perspective view of the transport guides, illustrating wide banknote guide parts in transverse section.

In the present specification, the banknote handling device generally includes various vending machines, a change machine, a cash dispenser, and other devices that receive input banknotes (paper sheets) and provide goods or services for a user.

While banknotes are cited as one example of paper sheets in the following embodiment, the present device is also applicable to widthwise shifting or skew correction in transport of paper sheets other than banknotes, for example, securities and tickets.

<Banknote Transport Device>

A banknote (paper sheet) transport device 1 is used in a state attached to a banknote (paper sheet) handling device body (not illustrated), and banknotes received by the banknote transport device 1 are subjected to recognition of banknote authenticity and denomination by a recognition sensor and are then sequentially stored one by one in a banknote stacking unit such as a cashbox in the banknote handling device body. When a banknote to be transported in the banknote transport device 1 is displaced in the transport position or skewed, a recognition failure or jam occurs, or the alignment of banknotes stored in a stacked state in the cashbox is deteriorated, which causes a decrease of the workability in subsequent handling of the banknotes. For this reason, the transport position and the transport attitude of a banknote introduced into the banknote transport device 1 and transported therein are required to be fixed or within an acceptable range.

As illustrated in FIG. 1, the banknote transport device 1 includes a lower unit 3, and an upper unit 4 supported by a shaft part (not illustrated) to be capable of opening and closing with respect to the lower unit 3, and a banknote transport path (transport path space) 10 is formed between these units when the units are closed as illustrated in FIG. 1. The banknote transport device 1 generally includes a friction transport device 2 that transports a banknote P inserted into the banknote transport path 10 (a banknote transport surface 11) toward the back, movable transport guides 310 that can guide in common a wide banknote having a maximum short edge size (a maximum width dimension) not more than 72 mm and less than 86 mm, and a narrow banknote having a maximum width dimension less than 72 mm, and a transport guide drive mechanism 300 that changes a distance by which the transport guides are protruded from the transport surface according to a difference in the width dimension of a banknote to be transported to realize transport and widthwise shifting in an optimal transport condition.

The friction transport device 2 decreases the transport grip for a banknote to enable the banknote to move freely enough to sideslip (slip with a drive roller), and the transport guides 310 then perform widthwise shifting of the banknote, whereby effective widthwise shifting can be performed. As the transport guides, narrow banknote guide parts 320 and wide banknote guide parts 330 are adjacently arranged in an upper/lower positional relation. Therefore, a banknote as a transport target can be switched only by advancing or retreating the transport guides by the minimum distance in a direction orthogonal to the transport surface. That is, with one type of the banknote transport device 1, the widthwise shifting can be performed while addressing two or more kinds of banknotes having different short edge dimensions.

The friction transport device 22 illustrated and described is one example and other transport mechanisms are applicable to the banknote transport device 1 when such mechanisms have a configuration that can decrease the transport grip.

<Friction Transport Device>

Figure 14:
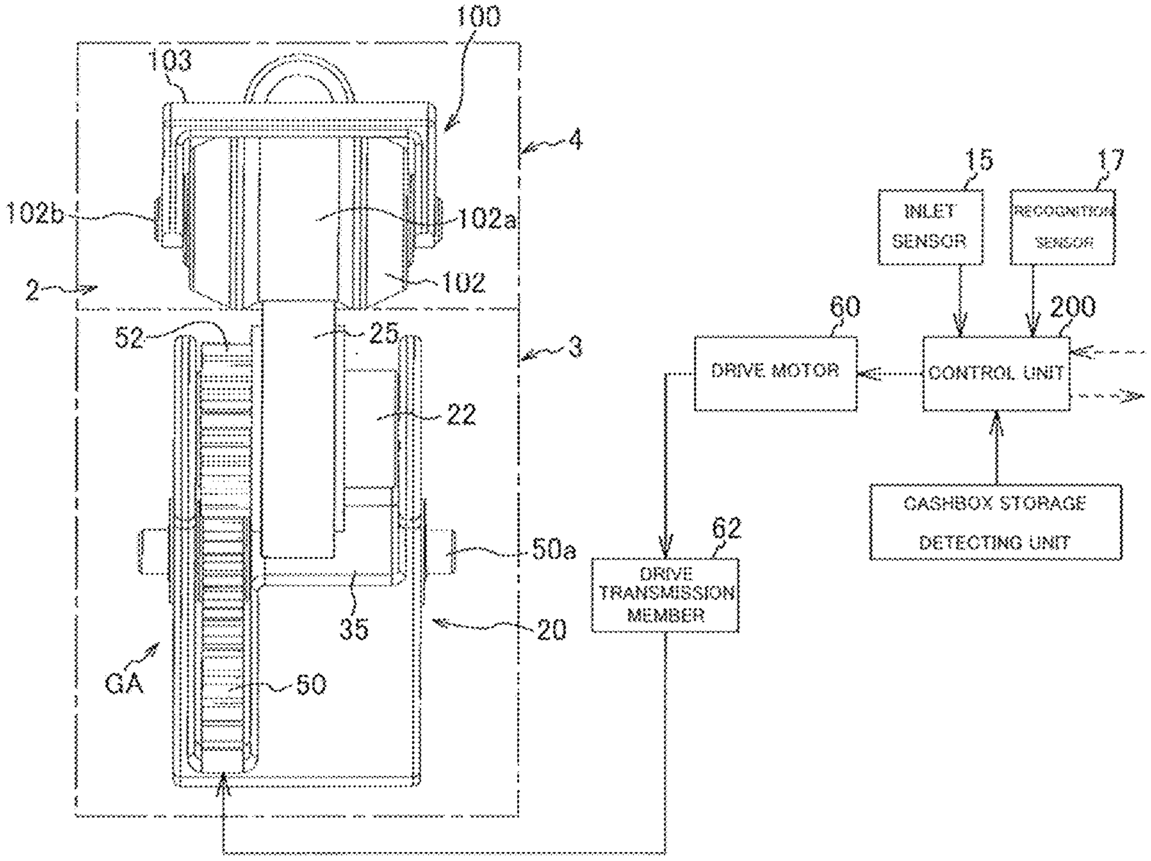
FIG. 14 is a front view of relevant parts of the friction transport device.
Figure 15:
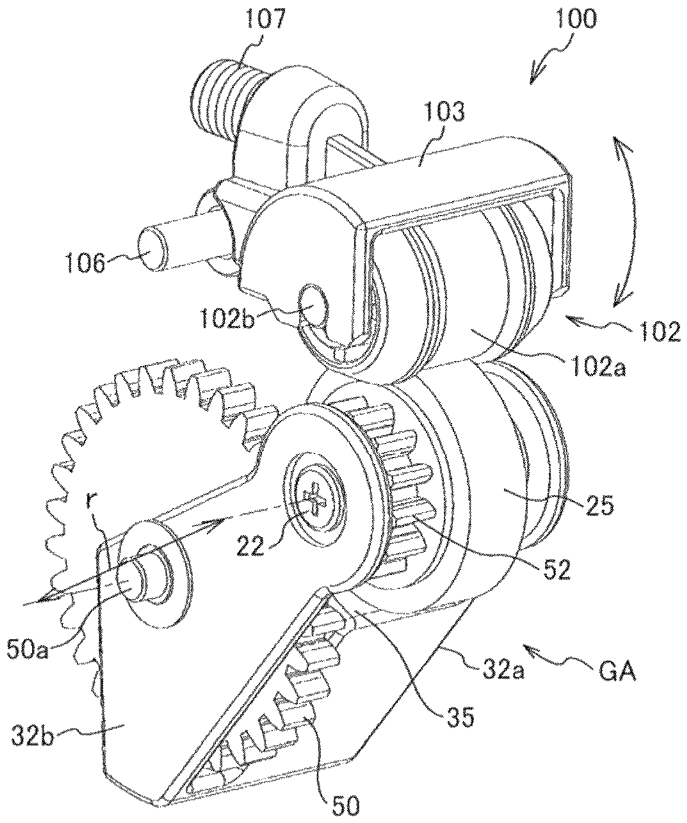
FIGS. 15(*a*) and 15(*b*) are perspective views of relevant parts of the friction transport device.
Figure 15:
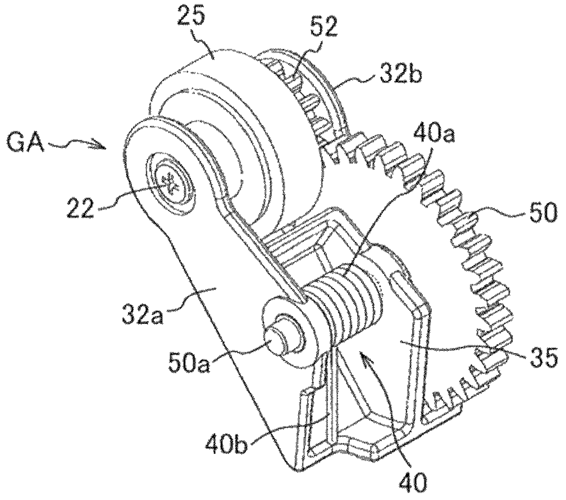

As illustrated in FIGS. 14 and 15, the friction transport device 2 generally includes a drive-side unit 20 that transmits a transport driving force to one surface (a lower surface) of a banknote P transported with the surface in contact with the upper surface (the banknote transport surface 11) of the banknote transport path (the transport path) 10, a drive source (a drive motor) 60 that supplies a driving force to the drive-side unit, drive transmission members 62 that transmit the driving force from the drive source to the drive-side unit 20 and the like being driven targets, a driven roller 102 (a driven-side unit 100) that is arranged to oppose the drive-side unit and that rotates in a driven manner being in contact with the other surface of the banknote, a transport grip adjustment mechanism GA that can change a transport grip between a drive roller, which will be described later, and a banknote, and a control unit 200 that controls various control targets.

As illustrated in FIGS. 1, 2 and other drawings, the banknote transport surface 11 that guides the lower surface of a banknote P with the upper surface, an inlet sensor (banknote detection sensor) 15 that is constituted of an optical sensor or the like detecting entry of an inserted banknote, lower transport rollers 16*a* that are each arranged with a circumferential surface exposed from an opening provided on the banknote transport surface 11 (a back transport surface 11*c*) downstream from the friction transport device 2, upper transport rollers 16*b* that are arranged on the side of the upper unit 4 to oppose the transport rollers 16*a*, and a recognition sensor 17 constituted of an optical sensor or the like are arranged on the banknote transport path 10.

In the present embodiment, since the banknote transport surface 11 is a substantially horizontal surface, the upper side and the lower side are referred to on the basis of the banknote transport surface. However, the banknote transport surface is not limited to a horizontal surface. In a case in which the banknote transport surface is not a horizontal surface, a side corresponding to the "upper side" is the side of one surface of the banknote transport surface, that is, a "front surface side" and a side corresponding to the "lower side" is the side of the other surface of the banknote transport surface, that is, a "back surface side".

The transport rollers 16*a* on the drive side, the drive-side unit 20, and other drive targets are driven by the drive motor 60 via the drive transmission member 62.

The control unit 200 stops the drive-side unit 20 when a first banknote is transported by driving of the drive-side unit 20 on the banknote transport path 10 toward the inner back part and the rear end portion of the banknote passes the recognition sensor 17. Accordingly, even when a second banknote is inserted into a nip part between the drive roller and the driven roller, the banknote is not transported. Also after the stop of the drive-side unit, the first banknote is transported to the cashbox by driving of the transport rollers 16*a* and 16*b* at the back of the recognition sensor. When storage into the cashbox is detected by a cashbox storage detecting unit, the control unit 200 temporarily stops the drive motor 60. Upon detection of completion of the storage of the first banknote into the cashbox, the control unit 200 causes the device to proceed to a state in which second and subsequent banknotes can be transported. That is, with detection of insertion of a second banknote into the inlet of the banknote transport path by the inlet sensor 15, the control unit 200 resumes driving of the drive-side unit 20.

As illustrated in FIG. 1, a drive transmission mechanism DM that transmits the driving force from the drive motor 60 to a drive roller 25 constituting the transport grip adjustment mechanism GA includes the drive-side unit 20, the transport rollers 16, and other members. The drive transmission members 62 such as a gear, a belt, and a pully (not illustrated) are placed between the drive motor 60 and the drive roller 25, and transmit the driving force from the drive motor to the drive roller 25 and the transport rollers 16*a* and 16*b*.

A discharge port communicated with a cashbox (not illustrated) is positioned at a rear end portion of the banknote transport path 10.

As illustrated in FIGS. 1 and 2, the banknote transport surface (transport surface) 11 has a large width dimension suitable to transport a wide banknote having the width dimension less than 86 mm throughout the length in the transport direction. The banknote transport surface 11 has an inlet-side transport surface 11*a* close to an inlet 10*a* being a banknote insertion port, an intermediate transport surface 11*b* located at the back, and the back transport surface 11*c* located in the most back portion. That is, a narrow transport surface for transporting a narrow banknote is not provided in the present invention.

Inlet-side sidewalls 12 are erected on both lateral sides of the inlet-side transport surface 11*a*, and back sidewalls 14 are erected on both lateral sides of the back transport surface 11*c*. Transport guides 310L and 310R are respectively arranged in openings 11*b*' for protrusion and retraction, which are respectively formed along the both side edges of the intermediate transport surface 11*b*, to be capable of being protruded and retracted.

The friction transport device 2 in this example is arranged within the range of the intermediate transport surface 11*b*. This is to prevent or eliminate a banknote P introduced from the inlet 10*a* from being brought to contact with the transport guides 310 to be subject to a reaction force and from being intensely pressurized at a leading corner portion by the transport guides to be deformed, or to cause skew.

The friction transport device 2 is means for correcting an introduction attitude or a transport attitude of a banknote P to be aligned with a central axis CL of the transport path or with the transport guides in a course in which the banknote P that is brought to contact with a sidewall or the like (the transport guides 310) of the transport path to receive a reaction force in a direction different from the normal transport direction due to being inserted by a user from the inlet 10*a* of the banknote transport path 10 from various positions, at various angles, or in various directions and with various irregular attitudes is continuously and unintermittently introduced and transported toward the back portion of the transport path.

Specific configurations and operations of the friction transport device 2 are described later.

<Transport Guide Drive Mechanism>

The transport guide drive mechanism 300 generally includes the transport path 10 including the transport surface 11 that guides one surface of a banknote, the transport guides 310 (310R and 310L) that are respectively arranged along the both side edges of the transport surface in the width direction to oppose each other and that respectively guide the both side edges of a paper sheet to be transported, an advancing/retreating mechanism 350 that causes the transport guides to advance or retreat (to be protruded or retracted) integrally (synchronously) in a height (thickness) direction orthogonal to the transport surface, stoppers (stopper members, see FIGS. 6) 440*a* and 440*b* that define an upper limit position (a protruded position) and a lower limit position (a retracted position) of the transport guides (that stop the transport guides at home positions), and a DC motor (a transport guide lifting/lowering motor) 450 that drives the advancing/retreating mechanism 350.

As illustrated in FIG. 3 and other drawings, the transport guides 310 (310R and 310L) include narrow banknote guide parts (narrow banknote guide grooves) 320 that advance and retreat in a direction orthogonal to (intersecting with) the transport surface 11 and that are arranged to oppose each other at a distance appropriate to guide the both side edges of a narrow banknote having a small width dimension, and wide banknote guide parts (wide banknote guide grooves) 330 that are adjacently arranged above or below (in the present example, below) the narrow banknote guide parts 320 and that are arranged to oppose each other at a distance appropriate to guide the both side edges of a wide banknote having a large width dimension. While not structurally integrated with each other, the transport guides according to the present embodiment are caused by the advancing/retreating mechanism 350 to synchronously and integrally advance and retreat. One transport guide 310R and the other transport guide 310L each include a transport guide body 312 long in the transport direction including the guide parts 320 and 330, two leg parts 314 protruded downward from a vicinity of both end edges in the longitudinal direction of a bottom part of the transport guide body 312, and rack gears 316 each provided at an opposing surface of each leg part.

Although the narrow banknote guide parts 320 are arranged in an upper part and the wide banknote guide parts 330 are arranged in a lower part in the present embodiment, the parts 320 and 330 may be in the opposite upper/lower relation.

The narrow banknote guide parts 320 are recessed parts (grooves) long in the transport direction, each formed between an upper wall 321 and an intermediate wall 322 parallel to each other, and the shape of inner back surfaces 325 thereof is configured to be appropriate to widthwise shift a narrow banknote to the central axis of the transport path while guiding (slidingly contacting) the narrow banknote in contact with the both side edges of the banknote in the width direction. That is, in the present example, as illustrated in FIG. 9(*a*), each of the inner back surfaces 325 includes a flat guide surface 325*a* located at a central portion in the longitudinal direction and being parallel to the banknote transport direction, and taper guide surfaces 325*b* and 325*c* as inclined surfaces respectively provided to be continuous on the upstream side (the front side) and the downstream side (the back side) of the flat guide surface 325*a*. The flat guide surface 325*a* is located closest to the central axis of the transport path and the taper guide surfaces 325*b* and 325*c* extend inclinedly from both end parts in the longitudinal direction of the flat guide surface 325*a* toward lateral sides (in directions away from the central axis of the transport surface), respectively.

A narrow banknote inserted from the inlet 10*a* in a state misaligned from the central axis of the transport surface first starts being shifted toward the center in the width direction in the course of advancing being guided on the both side edges in the width direction by the upstream taper guide surfaces 325*b*, and is brought to a state in which the central axis of the banknote is completely aligned with the central axis of the transport surface when the both side edges of the banknote pass the flat guide surfaces 325*a*.

The wide banknote guide parts 330 are recessed parts formed between the intermediate wall 322 and a lower wall 331 parallel to each other and being long in the transport direction, and the shape of inner back surfaces 335 thereof is configured to be appropriate to widthwise shift a wide banknote to the central axis of the transport path while guiding the both side edges of the banknote in the width direction. That is, in the present example, each of the inner back surfaces 335 is a flat guide surface 335*a* that is flat and parallel to the transport direction throughout the length as illustrated in FIG. 9(*b*).

A wide banknote inserted from the inlet 10*a* in a state misaligned from the central axis of the transport surface is corrected in the attitude in the course of advancing being guided on the both side edges in the width direction by the inner back surfaces 335, respectively, and is brought to a state in which the central axis of the banknote is completely aligned with the central axis of the transport surface when the both side edges of the banknote pass the inner back surfaces 335.

In the present embodiment, the narrow banknote guide parts 320 located on the upper side are at a height position appropriate to receive and guide the both side edges in the width direction of a narrow banknote (the width dimension is less than 72 mm) transported on the transport surface 11 when the transport guides 310 are at the retracted position (the lower limit position) illustrated in FIGS. 2(*a*), 3(*a*), 4(*a*), and 5(*a*) and other drawings. At this time, the wide banknote guide parts 330 are positioned lower than the transport surface 11 and shielded, and accordingly cannot be in contact with (receive) the banknote on the transport surface.

Meanwhile, when the transport guides 310 are at the protruded position (the upper limit position) illustrated in FIGS. 2(*b*), 3(*b*), 4(*b*), and 5(*b*) and other drawings, the wide banknote guide parts 330 are at a height position appropriate to receive and guide the both side edges in the width direction of a wide banknote (the width dimension is not less than 72 mm and less than 89 mm) transported on the transport surface 11. At this time, the narrow banknote guide parts 320 are located at a position separated upward from the transport surface 11 and cannot be in contact with (receive) the banknote on the transport surface.

The advancing/retreating mechanism 350 includes a gear mechanism (a drive transmission mechanism) 360 that is driven by the DC motor 450 and that causes the transport guides 310 to advance and retreat between the retracted position that is most retracted (lowered) from the transport surface and the protruded position that is protruded upward of the transport surface by a predetermined distance from the retracted position, the lowering stoppers 440*a* and the lifting stoppers 440*b* that are each fixedly arranged at appropriate places of the device body to catch and stop the transport guides at the retracted position and the protruded position, and an inertia absorption mechanism 400 that absorbs and reduces inertia moment of the motor that is to be transmitted from the output shaft of the DC motor 450 to the gear mechanism 360 after the motor stops (when the motor has stopped) at a timing the transport guides are respectively stopped by the stoppers at the retracted position or the protruded position.

The stoppers 440 include the lowering stoppers 440*a* that are respectively brought to contact with portions of the transport guides to prevent further lowering when the transport guides have reached the most lowered position, and the lifting stoppers 440*b* that are respectively brought to contact with different portions of the transport guides to prevent further lifting when the transport guides have reached the most lifted position (see FIGS. 6(*a*-2) and 6(*b*-2)).

The gear mechanism 360 includes the rack gears 316 that are respectively provided on the two leg parts 314 extending downward from the bottom part of the transport guide body 312 constituting each of the transport guides 310, pinion gears 370 each of which meshes with one of the rack gears and are rotationally driven to cause the transport guides to simultaneously advance and retreat, two drive-side gears 380 (380R and 380L) each of which has a shaft center fixed to a drive shaft 375 arranged along the width direction of the transport path and that are integrally rotationally driven by the driving force from the DC motor, and intermediate gears 390 (390R and 390L) each of which has a shaft center supported by the drive shaft 375 to be coaxial with one side surface (an outer side surface) of each of the drive-side gears and to be relatively rotatable with respect to the drive-side gears, and that always mesh with the pinion gears 370, respectively.

In the present embodiment, each of the intermediate gears 390 meshes with a rack gear 316 different from the rack gear 316 with which the associated pinion gear 370 meshes. Accordingly, the driving force from the DC motor is transmitted to the rack gears 316 provided on the leg parts 314 from the associated drive-side gear 380 and the associated intermediate gear 390, and causes the transport guides 310 to lower and lift integrally and synchronously. Since the two transport guides are driven to simultaneously lift and lower on the two leg parts 314, a balance thereof can be easily achieved at the time of parallelly moving the transport guides.

Further, the gear mechanism 360 further includes an output gear 451 of the DC motor 450, a spur gear 452*a* meshing with the output gear 451, a worm 452*b* coaxially integrated with the spur gear 452*a*, a worm wheel 453*a* meshing with the worm 452*b*, and a transmission gear 453*b* that is coaxially integrated with the worm wheel 453*a* to mesh with the drive-side gear 380.

<Inertia Absorption Mechanism>

As illustrated in FIGS. 7, the inertia absorption mechanism 400 generally includes the drive-side gears 380, the intermediate gears 390, and elastic members (inertia absorbing springs) 405 that are each arranged between the associated drive-side gear 380 and the associated intermediate gear 390 and that absorb and reduce inertia moment generated when the DC motor stops in the course of advancing or retreating of the associated transport guide 310.

Each of the elastic members 405 constituting the inertia absorption mechanism 400 is means (a compressed spring) that is arranged in an arc-like manner between the drive-side gear 380 and the intermediate gear 390 and that biases the intermediate gear 390 and the drive-side gear 380 in the circumferential direction. That is, the drive-side gear 380 has an annular recessed portion 381 on a surface opposing the intermediate gear 390, and the elastic member 405 constituted of a coil spring is arranged in the recessed portion 381 in an arc-like manner. Both end parts of the elastic member 405 are caught by pressing pieces (catching protrusions) 382*a*, 382*b*, 383*a*, and 383*b* provided to protrude in the radial direction from an inner wall of the recessed portion 381 of the drive-side gear 380. The pressing pieces 382*a*, 382*b*, 383*a*, and 383*b* are provided to protrude from an inner wall on the inner diameter side and an inner wall on the outer diameter side of the recessed portion 381 to interfere with the both end parts of the elastic member 405. The pressing pieces 382*a*, 382*b*, 383*a*, and 383*b* not only catch the both end parts of the elastic member and one of pressing pieces (pair) presses one end part of the elastic member to function to circumferentially press one of pressed pieces 391*a* and 391*b* provided on the intermediate gear 390 at the other end part of the elastic member.

A gap G is formed each of between the pressing piece 382*a* on the inner diameter side and the pressing piece 382*b* on the outer diameter side and between the pressing piece 383*a* on the inner diameter side and the pressing piece 383*b* on the outer diameter side. Reference sign 385 denotes the center hole of the drive-side gear.

While being extendable in the recessed portion 381 and an arc-like extension space formed by the pressing pieces 382*a*, 382*b*, 383*a*, and 383*b*, the elastic member 405 cannot spread beyond the pressing pieces (pairs).

Meanwhile, the pressed pieces 391*a* and 391*b* are provided at an interval of 180 degrees in a protruded manner on the opposing surface of the intermediate gear 390 that is arranged to oppose the elastic member 405. When the drive-side gear 380 and the intermediate gear 390 are coaxially assembled, the pressed pieces 391*a* and 391*b* fit in the recessed portion 381 of the drive-side gear and are in a positional relation (a non-interfering positional relation) in which the pressed pieces can pass through the gap G between two pressing pieces arranged to oppose each other in the radial direction. That is, the positional relation between the pressing pieces 382*a*, 382*b*, 383*a*, and 383*b*, and the pressed pieces 391*a* and 391*b* enables the pressed pieces to pass through the gap G in a course in which the drive-side gear 380 relatively rotates with respect to the intermediate gear 390.

The elastic member 405 arranged in the recessed portion 381 and the arc-like extension space formed by the pressing pieces 382*a*, 382*b*, 383*a*, and 383*b* is pressed at one end part by the pressing pieces and compressed in the course in which the drive-side gear 380 relatively rotates with respect to the intermediate gear 390 in the stopped state, thereby pressing one of the pressed pieces at the other end part to rotate the intermediate gear. In other words, the intermediate gear 390 rotates with pressing of the pressed pieces 391*a* and 391*b* by the elastic member 405.

[Explanatory Diagram of Operation of Transport Guide Drive Mechanism]

<Explanations of Lifting Operation>

Figure 10:
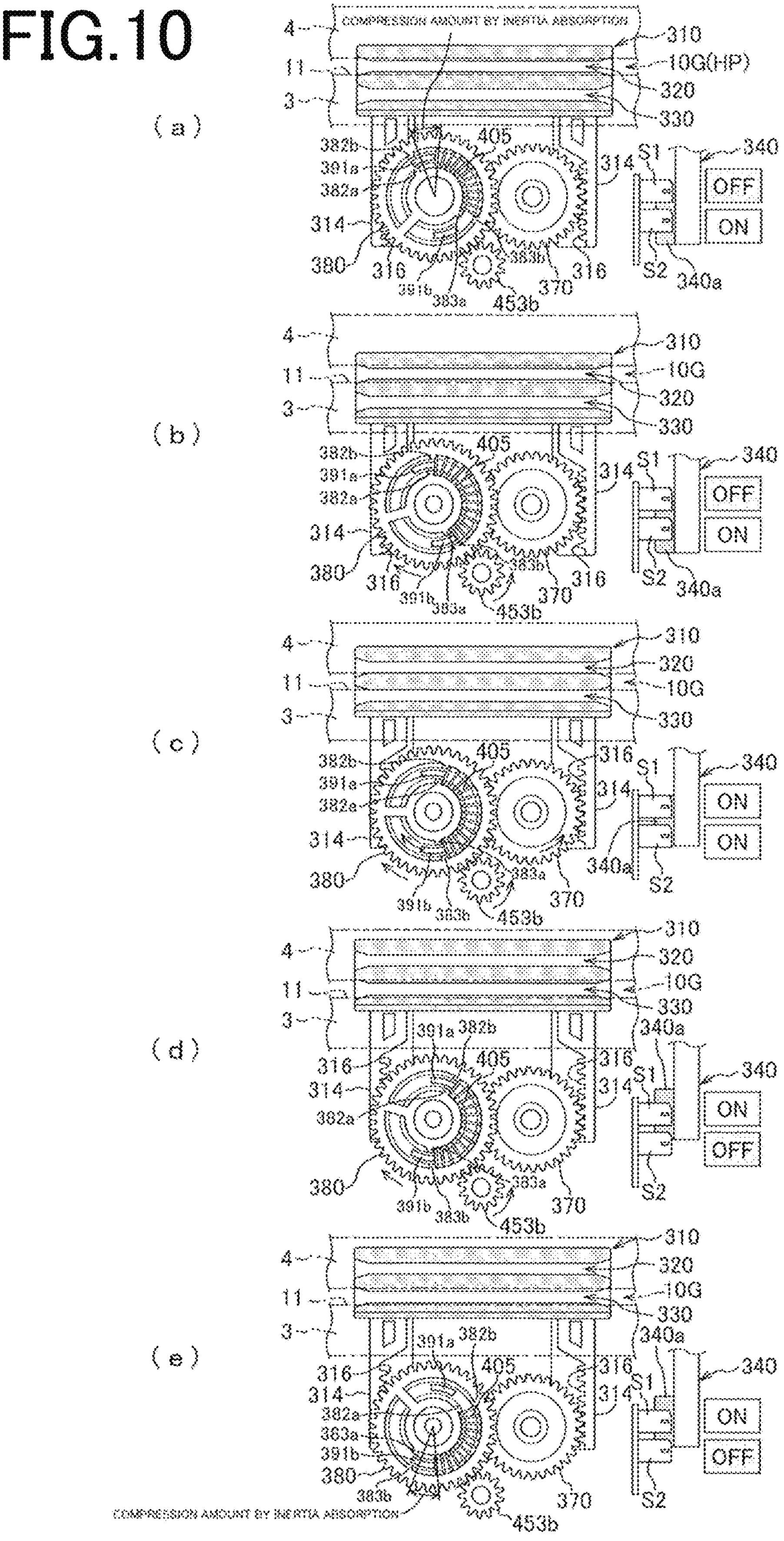
FIGS. 10(*a*) to 10(*e*) are explanatory diagrams of a process of moving transport guides at a most lowered position to a most lifted position.
Figure 12:
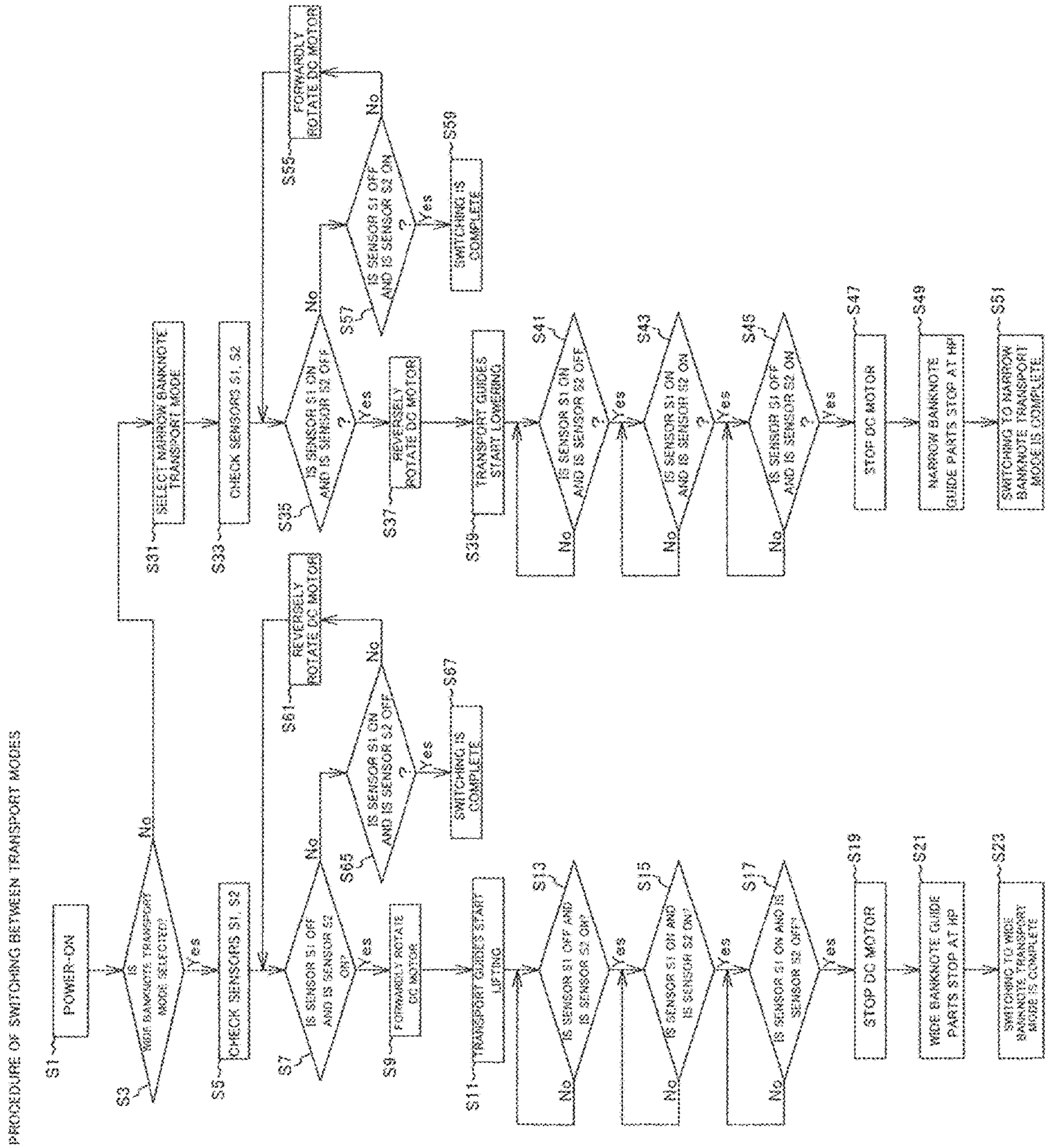
FIG. 12 is a flowchart explaining a switching procedure between transport modes.

FIGS. 10(*a*) to 10(*e*) are explanatory diagrams of a process of moving transport guides at the most lowered position (the retracted position) to the most lifted position (the protruded position). In other words, FIGS. 10(*a*) to 10(*e*) are explanatory diagrams of a lifting process of moving the transport guides from a state located at a height position (a guidable position=a home position) in which the narrow banknote guide parts 320 can guide a narrow banknote, to a height position (a guidable position=a home position) in which the wide banknote guide parts 330 can guide a wide banknote. FIG. 12 is a flowchart explaining a transport mode switching procedure between a narrow banknote transport mode and a wide banknote transport mode.

In the following descriptions, expressions with “each”, such as each of the transport guides, each of the drive-side gears, each of the pinion gears, and each of the intermediate gears are not used in principle to simplify the explanations, and simple expressions such as the transport guide, the drive-side gear, the pinion gear, and the intermediate gear are used.

In the banknote transport device 1, the initial transport mode is automatically switched to the narrow banknote transport mode or the wide banknote transport mode by software that is previously incorporated according to product destination countries. For example, in a case in which software for the USA where only narrow banknotes having the maximum width of 65 mm circulate is incorporated, the initial transport mode is automatically set to the narrow banknote transport mode. When software for the Eurozone having the maximum width of 62 to 82 mm is incorporated, the initial transport mode is always automatically set to the wide banknote transport mode.

When the initial transport mode of the banknote transport device 1 is set to the narrow banknote transport mode, the banknote transport device 1 is operated in a state in which the narrow banknote guide parts 320 are located at the home position (a height position communicated with a transport path space 10G) as in FIG. 10(*a*). When the initial transport mode is set to the wide banknote transport mode, the control unit 200 forwardly rotates the DC motor to lift the transport guides in a procedure illustrated in FIGS. 10(*b*) to 10(*e*) and move the wide banknote guide parts 330 to the home position (a height position communicated with the transport path space 10G).

While the recessed portion 381, the pressing pieces 382*a*, 382*b*, 383*a*, and 383*b*, the elastic member 405, and the pressed pieces 391*a* and 391*b* are illustrated by solid lines on the front side of the drive-side gear 380 in FIG. 10 for the convenience of illustrations and descriptions, these members are actually positioned on the back side of the drive-side gear 380 and are supposed not to be visually recognized. However, this way of illustrations and descriptions is adopted for the sake of explaining the operations of the members while recognizing the positional relations of the members. This adoption also applies to FIG. 11.

First, FIG. 10(*a*) (FIG. 6(*a*-1)) illustrates a standby state in which the transport guides are at the height position (the lower limit position=the retracted position) where the narrow banknote guide parts 320 can guide a narrow banknote, and the elastic members 405 have been compressed by absorption of inertia generated when the DC motor 450 is stopped in the last lowering operation (which will be described later with reference to FIG. 11) (the compression amount is indicated by an arrow) in this state. Reference sign 10G in the drawings denotes a transport path space, that is, a space through which banknotes pass. A banknote can be received and transported only when this transport path space 10G is communicated with the narrow banknote guide parts 320 in an aligned manner. In the state illustrated in FIG.

10(*a*), the narrow banknote guide parts 320 are aligned and communicated with the transport path space 10G.

In this standby state, the transport guides 310 are at the most lowered position and the DC motor 450 has been stopped. The transport guides abut the lowering stoppers 440*a* (FIG. 6(*a*-2)) and cannot lower any more.

At this time, the narrow banknote guide parts 320 are aligned with the transport path space 10G. When a narrow banknote is inserted into the inlet 10*a* in this state and the friction transport device 20 is driven in the receiving direction, the narrow banknote having entered between the narrow banknote guide parts 320 in a state displaced from the central axis of the transport surface is transported while the both side edges of the banknote in the width direction are guided by the narrow banknote guide parts to widthwise shift the banknote toward the central axis of the transport path.

When a narrow banknote is brought to contact with the transport guides and receives a reaction force, the friction transport device 20 actuates the transport grip adjustment mechanism GA with the reaction force to reduce the transport grip with the drive roller 25 and the driven roller 102. Accordingly, the narrow banknote can sideslip on the nip part between these rollers to freely change the transport position and the transport attitude. Therefore, the narrow banknote can be corrected in the transport position and the transport attitude by the guide surfaces 325*a*, 325*b*, and 325*c* in the narrow banknote guide parts 320 and enables the central axis of the banknote to be aligned with the central axis of the transport path.

In the state in FIG. 10(*a*), the elastic member 405 is pressed at the lower end part in the counterclockwise direction by the lower pressing pieces 383*a* and 383*b* and is compressed. Therefore, the upper end of the elastic member 405 is in a state pressing the upper pressed piece 391*a* (stopped in an unrotatable state) in the same direction.

Reference sign 340 denotes a detectable member that is integrated with the transport guides 310 to lift and lower, and a first sensor S1 that detects the home position of the narrow banknote guide part and a second sensor S2 that detects the home position of the wide banknote guide part are arranged in an upper/lower positional relation on a route on which a detectable piece 340*a* provided on the detectable member 340 lifts and lowers. In the state in FIG. 10(*a*), the first sensor S1 is OFF and the second sensor S2 is ON. Accordingly, a state in which the narrow banknote guide part is at the home position is detected.

When control to switch the mode to the wide banknote transport mode is started in this state, the DC motor 450 forwardly rotates and the transport guide starts lifting.

A procedure of switching the transport mode is explained next with reference to a flow illustrated in FIG. 12.

When the banknote transport device 1 is powered on (Step S1), whether the wide banknote transport mode is selected is checked at Step S3. When the wide banknote transport mode is selected, the output of each of the sensors S1 and S2 is checked (Steps S5 and S7). When the first sensor S1 is OFF and the second sensor S2 is ON at Step S7, the transport guide 310 is at the lowered position and accordingly the transport guide 310 is caused to start lifting by forwardly rotating the DC motor (Steps S9 and S11).

FIG. 10(*b*) illustrates a state (an elastic member compression canceled state) immediately after the DC motor 450 starts forwardly rotating. The transmission gear 453*b* rotates by a required angle in the forward rotation direction (the counterclockwise direction) indicated by an arrow, whereby the drive-side gear 380 rotates in the clockwise direction and pressing on the elastic member by the lower pressing pieces 383*a* and 383*b* is canceled. That is, the compression of the elastic member compressed in the state in FIG. 10(*a*) is canceled and the elastic member returns to the original shape. Since the driving force to lift the transport guide 310 is not transmitted to the pinion gear 370 in this state, the height position of the transport guide is not changed and the output state of each of the sensors S1 and S2 is not changed from that in FIG. 10(*a*) (Step S13 YES).

FIG. 10(*c*) illustrates a state in which the lower pressed piece 391*b* of the intermediate gear 390 is pressed by the elastic member 405 and starts rotating in the clockwise direction, so that the driving force is transmitted from the intermediate gear to the pinion gear 370 and the transport guide starts lifting. That is, the upper pressing pieces 382*a* and 382*b* of the drive-side gear press the upper end part of the elastic member in the clockwise direction, whereby the lower end part of the elastic member presses the lower pressed piece 391*b* (the intermediate gear) in the clockwise direction.

Although each of the transport guides 310 has been lifted from the height position in FIG. 10(*b*) at this time point, the wide banknote guide part 330 has not reached the transport path space 10G yet and is at an intermediate position.

Since the transport guide has been lifted just before the most lifted position, the first sensor S1 that has been OFF is turned ON and the second sensor S2 is kept ON (Step S15 YES).

FIG. 10(*d*) illustrates a state in which the drive-side gear 380 further rotates, so that the transport guide reaches the most lifted position (HP) and stops. The transport guide abuts the lifting stopper 440*b* and is prevented from lifting further.

Due to the further rotation of the drive-side gear 380, the upper pressing pieces 382*a* and 382*b* further depress the upper end part of the elastic member in the clockwise direction, so that the lower end part of the elastic member presses the lower pressed piece 391*b* in the clockwise direction to further rotate the intermediate gear 390. Accordingly, the intermediate gear rotates the pinion gear 370 in the counterclockwise direction to further lift the transport guide. When the transport guide reaches the most lifted position and stops lifting, the intermediate gear and the pinion gear stop rotating.

At this time point, the wide banknote guide part 330 has reached the transport path space 10G (HP).

At this time point, the second sensor S2 having been ON is turned OFF and the first sensor S1 is kept ON (reaching of the wide banknote guide part to the home position is detected. Step S17 YES). With turning OFF of the second sensor S2, the powering of the DC motor 450 is interrupted and braking is started (Step S19). As is well known, in the DC motor, the driving force from the output gear 451 does not immediately stop and the driving force is transmitted to the gear mechanism 360 due to inertia even when the power is interrupted. Meanwhile, since each of the transport guides 310 abuts the lifting stopper 440*b* and cannot lift beyond the illustrated position, the pinion gear 370 and the intermediate gear 390 are locked. Accordingly, without absorption and reduction of the inertia of the DC motor, lock and friction between the gears occur and this leads to wear and a decrease in the durability of components constituting the gear mechanism or the DC motor itself. Furthermore, a reaction force from a banknote passing through the transport guide that is not immobilized causes rattling of the transport guide. Therefore, the banknote guiding function of the transport guide is destabilized.

Other disadvantages of the case in which the inertia absorption mechanism is not provided are as follows. That is, first, even if the DC motor can be gradually decelerated by PWM control to suppress inertia and can be stopped without being locked at the home position, the operation time is increased by a time required to decelerate the DC motor by the PWM control and the overall processing speed and processing efficiency are decreased. A state in which the DC motor is stopped without being locked indicates that play remains between the gears, and there is a possibility that the transport guides cause rattling.

FIG. 10(*e*) illustrates a state in which the inertia absorption mechanism 400 is actuated and is absorbing the inertia or has absorbed the inertia. At this time point, the wide banknote guide part 330 has reached the transport path space 10G (the home position) and switching to the wide banknote transport mode is completed (Steps S21 and S23).

In the present embodiment, by absorption of the inertia using the inertia absorption mechanism 400, the downstream gear mechanism can be reliably stopped without a delay (a gap) in the timing, without causing the trouble described above and without damaging the gear components and the DC motor at the time of stopping the DC motor.

Since the drive-side gear 380 continues the relative rotation with respect to the intermediate gear 390 that has stopped rotating in FIG. 10(*d*) while compressing the elastic member 405, the upper pressing pieces 382*a* and 382*b* continues to press the upper end part of the elastic member in the clockwise direction. At this time, the lower end part of the elastic member is caught by the pressed piece 391*b* in the stopped state and accordingly the elastic member is compressed. The amount of compression of the elastic member is the amount or energy of absorbed inertia. Therefore, the driving force from the motor is canceled by the inertia absorption mechanism 400 and occurrence of damages on the intermediate gear, the pinion gear, and the DC motor is prevented.

As this configuration is described in more detail, when the transport guide 310 that is lifting abuts the lifting stopper 440*b* and stops, the second sensor S2 detects this stop and control unit 200 stops the DC motor. However, the DC motor does not immediately stop even when the power is interrupted, and the driving force is transmitted from the output gear 451 to the gear mechanism 360. When the transport guide stops at the most lifted position, the pinion gear 370 and the intermediate gear 390 are locked while the worm wheel 453*a*, the transmission gear 453*b*, and the drive-side gear 380 continue to rotate due to the inertia from the DC motor. The inertia can be absorbed by relatively rotating the drive-side gear 380 with respect to the intermediate gear 390 to compress the elastic member 405.

If the drive-side gear 380 does not relatively rotate with respect to the intermediate gear 390, not only the drive-side gear 380 but also other gears 453*a*, 453*b*, 452*a*, and 452*b* located upstream are locked when the transport guide stops at the most lifted position and the DC motor stops, which causes the DC motor to be locked. In this case, the DC motor is subject to excess load and fails, or the gears are broken.

In the present embodiment, the problems described above are solved by canceling the lock of the drive gear 380 using the inertia absorption mechanism at the time of stopping the transport guide and at the time of stopping the DC motor.

When a wide banknote is inserted into the inlet 10*a* in the state illustrated in FIG. 10(*e*) and the friction transport device 20 is driven in the receiving direction, the wide banknote guide parts 330 guide the both side edges in the width direction of the wide banknote to be transported, thereby enabling the banknote to pass while the skew is corrected. That is, in the skew correction, a transport state in a state in which the position, angle, and attitude of a banknote are corrected and the banknote is aligned with one of the sidewalls (or the central axis CL) can be obtained. For example, when a banknote having the width of 60 mm is inserted into the wide banknote guide part 330 that is 86 mm in the width, the banknote is not centered on the transport path and is transported along a sidewall.

In the case of NO at Step S7, that is, when the first sensor S1 is ON and the second sensor S2 is OFF, switching to the wide banknote transport mode is complete (Steps S65 and S67).

In the case of NO at Step S65, that is, when the first sensor S1 and the second sensor S2 are both ON, the transport guide is at an intermediate position and accordingly the DC motor is reversely rotated (Step S61).

As a case in which the transport guide is at an intermediate position, a state immediately after product assembly or a state caused by tampering is assumed.

<Explanations of lowering operation>

Figure 11:
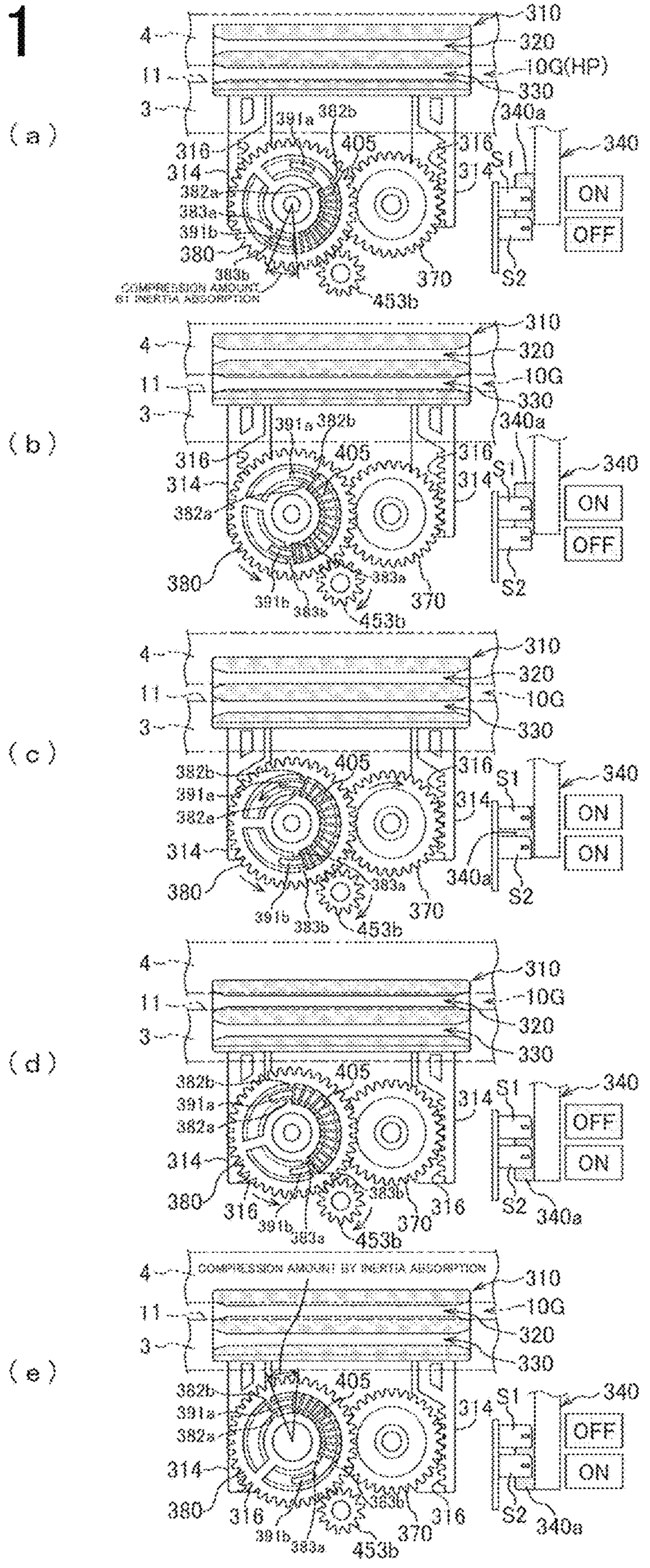
FIGS. 11(*a*) to 11(*e*) are explanatory diagrams of a process of moving a transport guide at a most lifted position to a most lowered position.

FIGS. 11(*a*) to 11(*e*) are explanatory diagrams of a process of moving the transport guide at the most lifted position to the most lowered position. In other words, FIGS. 11(*a*) to 11(*e*) are explanatory diagrams of a lowering process of moving the transport guide from a state located at a height position (a guidable position) where the wide banknote guide part 330 can guide a wide banknote, to a height position (a guidable position) where the narrow banknote guide part 320 can guide a narrow banknote.

In the wide banknote transport mode, the banknote transport device 1 is operated in a state in which the wide banknote guide part 330 is located at the home position as illustrated in FIG. 11(*a*). Meanwhile, when the transport mode is switched to the narrow banknote transport mode, the control unit 200 reversely rotates the DC motor 450 to lower the transport guide in a procedure illustrated in FIGS. 11(*b*) to 11(*e*) and move the narrow banknote guide part 330 to the home position.

First, FIG. 11(*a*) illustrates a standby state in which the transport guide is at the height position (the lower limit position) where the wide banknote guide part 330 can guide a wide banknote, and the elastic member 405 in this state is compressed by absorption of the inertia generated when the DC motor 450 is stopped in the last lifting operation explained with reference to FIG. 10 (the compression amount is indicated by an arrow). A wide banknote can be received only when the space 10G is communicated with the wide banknote guide part 330 in an aligned state as in the standby state illustrated in FIG. 11(*a*).

In this standby state, the transport guide 310 is at the most lifted position and the DC motor 450 has been stopped. The transport guide abuts the lifting stopper 440*b* and cannot lift any more.

At this time, the wide banknote guide parts 330 are aligned with the transport path space 10G. When a wide banknote is inserted into the inlet 10*a* in this state and the friction transport device 20 is driven in the receiving direction, the wide banknote having entered between the wide banknote guide parts is transported while the wide banknote guide parts 330 guide the both side edges of the banknote in the width direction to widthwise shift the banknote toward the central axis of the transport path or correct the attitude.

At this time, since the elastic member 405 is pressed at the upper end part in the clockwise direction by the upper pressing pieces 382*a* and 382*b* and is compressed, the lower end part of the elastic member presses the lower pressed piece 391*b* (stopped in an unrotatable state) in the same direction.

The lowering operation is explained based on the flowchart of FIG. 12. When the wide banknote transport mode is not selected at Step S3, the narrow banknote transport mode is selected (Step S3 NO and Step S31). When the narrow banknote transport mode is selected, the output of each of the sensors S1 and S2 is checked (Steps S33 and S35). When the first sensor S1 is ON and the second sensor S2 is OFF at Step S35, the transport guide 310 is at the lifted position and accordingly the transport guide 310 is caused to start lowering by reversely rotating the DC motor (Steps S37 and S39).

In FIG. 11(*a*), the first sensor S1 is ON and the second sensor S2 is OFF, and a state in which the wide banknote guide part 330 is at the home position is detected.

FIG. 11(*b*) illustrates a state (an elastic member compression canceled state) immediately after the DC motor 450 starts reversely rotating. The transmission gear 453*b* rotates by a required angle in the reverse rotation direction (the clockwise direction) indicated by an arrow, whereby the drive-side gear 380 rotates in the counterclockwise direction and pressing of the elastic member by the upper pressing pieces 382*a* and 382*b* is canceled. That is, the compression of the elastic member compressed in the state in FIG. 11(*a*) is canceled and the elastic member returns to the original shape. Since the driving force to lower the transport guide 310 is not transmitted to the pinion gear 370 in this state, the height position of the transport guide is not changed and the output state of each of the sensors S1 and S2 is not changed from that in FIG. 11(*a*) (Step S41).

FIG. 11(*c*) illustrates a state in which the upper pressed piece 391*a* of the intermediate gear 390 is pressed by the elastic member 405 and starts rotating in the counterclockwise direction, so that the driving force is transmitted from the intermediate gear to the pinion gear 370 and the transport guide starts lowering. That is, the lower pressing pieces 383*a* and 383*b* of the drive-side gear press the lower end part of the elastic member in the counterclockwise direction, whereby the upper end part of the elastic member presses the upper pressed piece 391*a* in the counterclockwise direction.

Although each of the transport guides 310 has been lowered from the height position in FIG. 11(*b*) at this time point, the narrow banknote guide part 330 has not reached the transport path space 10G yet.

Since the transport guide has been lowered just before the most lowered position, the second sensor S2 having been OFF is turned ON and the first sensor S1 is kept ON (Step S43 YES).

FIG. 11(*d*) illustrates a state in which the drive-side gear 380 further rotates, so that the transport guide reaches the most lowered position and stops. The transport guide abuts the lowering stopper 440*a* and is prevented from lowering further, and the DC motor is also stopped due to turning OFF of the first sensor S1 (Step S45 YES and Step S47).

In FIG. 11(*d*), due to further rotation of the drive-side gear 380, the lower pressing pieces 383*a* and 383*b* further depress the lower end part of the elastic member in the counterclockwise direction, so that the upper end part of the elastic member presses the upper pressed piece 391*a* in the counterclockwise direction to further rotate the intermediate gear 390. Accordingly, the intermediate gear rotates the pinion gear 370 in the clockwise direction to further lower the transport guide. When the transport guide reaches the most lowered position and stops lowering, the intermediate gear and the pinion gear stop rotating.

At this time point, the narrow banknote guide part 320 has reached the transport path space 10G (the home position).

At this time point, the first sensor S1 having been ON is turned OFF and the second sensor S2 is kept ON (reaching of the narrow banknote guide part to the home position is detected) (Step S45 YES). With turning OFF of the first sensor S1, the powering to the DC motor is interrupted and breaking is started (Step S47). Even when the power to the DC motor is interrupted, the driving force from the output gear 451 does not immediately stop and the driving force is transmitted to the gear mechanism 360 due to inertia. Meanwhile, since each of the transport guides 310 abuts the lowering stopper 440*a* and cannot lower beyond the illustrated position, the pinion gear 370 and the intermediate gear 390 are locked. As explained with reference to FIGS. 10, various troubles occur when the inertia of the DC motor is not absorbed and reduced.

That is, since the drive-side gear 380 continues the relative rotation with respect to the intermediate gear 390 that has stopped rotating in FIG. 11(*d*) while compressing the elastic member 405, the lower pressing pieces 383*a* and 383*b* continue to press the lower end part of the elastic member in the counterclockwise direction. At this time, the upper end part of the elastic member is caught by the pressed piece 391*a* in the stopped state and accordingly the elastic member is compressed. The amount of compression of the elastic member is the amount of energy of absorbed inertia. Therefore, the driving force from the motor is canceled by the inertia absorption mechanism 400 and occurrence of damages on the intermediate gear, the pinion gear, and the DC motor is prevented (FIG. 11(*e*)).

FIG. 11(*e*) illustrates a state in which the inertia absorption mechanism 400 is actuated and is absorbing the inertia or has absorbed the inertia. At this time point, the narrow banknote guide part 320 has reached the transport path space 10G (the home position) and switching to the narrow banknote transport mode is completed (Steps S49 and S51).

This is described in more detail. When the transport guide 310 that is lowering abuts the lowering stopper 440*a* and stops, the first sensor S1 detects this stop and the control unit 200 stops the DC motor. However, the DC motor does not immediately stops even when the power is interrupted, and the driving force is transmitted from the output gear 451 to the gear mechanism 360. When the transport guide stops at the most lowered position, the pinion gear 370 and the intermediate gear 390 are locked while the worm wheel 453*a*, the transmission gear 453*b*, and the drive-side gear 380 continue to rotate due to the inertia from the DC motor. The inertia can be absorbed by relatively rotating the drive-side gear 380 with respect to the intermediate gear 390 to compress the elastic member 405.

Troubles occurring if the drive-side gear 380 does not relatively rotate with the intermediate gear 390 are as explained with reference to FIG. 10.

In the present embodiment, the problems described above are solved by canceling the lock of the drive-side gear 380 at the time of stopping the transport guide and at the time of stopping the DC motor using the inertia absorption mechanism 400.

In the present embodiment, by absorption of the inertia using the inertia absorption mechanism 400, the downstream gear mechanism can be reliably stopped without a time lag, without occurrence of the troubles described above and without damages on the gear components and the DC motor at the time of stopping the DC motor.

When a narrow banknote is inserted into the inlet 10*a* in the state illustrated in FIG. 11(*e*) and the friction transport device 20 is driven in the receiving direction, the narrow banknote guide parts 320 guide the both side edges in the width direction of the narrow banknote to be transported, thereby causing the banknote to pass while the banknote is widthwise shifted toward the central portion of the transport path with the skew being corrected.

While the narrow banknote guide parts 320 are arranged on the upper side of the transport guides 310 and the wide banknote guide parts 330 are arranged on the lower side in the present embodiment, this configuration may be vertically inverted. Also in the inverted configuration, the operation procedures illustrated in FIGS. 10 and 11 may be applied.

In the case of NO at Step S35, that is, when the first sensor S1 is OFF and the second sensor S2 is ON, switching to the narrow banknote transport mode is complete (Steps S57 and S59).

In the case of NO at Step S57, that is, when the first sensor S1 and the second sensor S2 are both ON, the transport guides are at an intermediate position and accordingly the DC motor is forwardly rotated (Step S55).

As a case in which the transport guide is at an intermediate position, a state immediately after product assembly or a state caused by tampering is assumed.

<Returning Procedure in Each Banknote Transport Mode>

Figure 13:
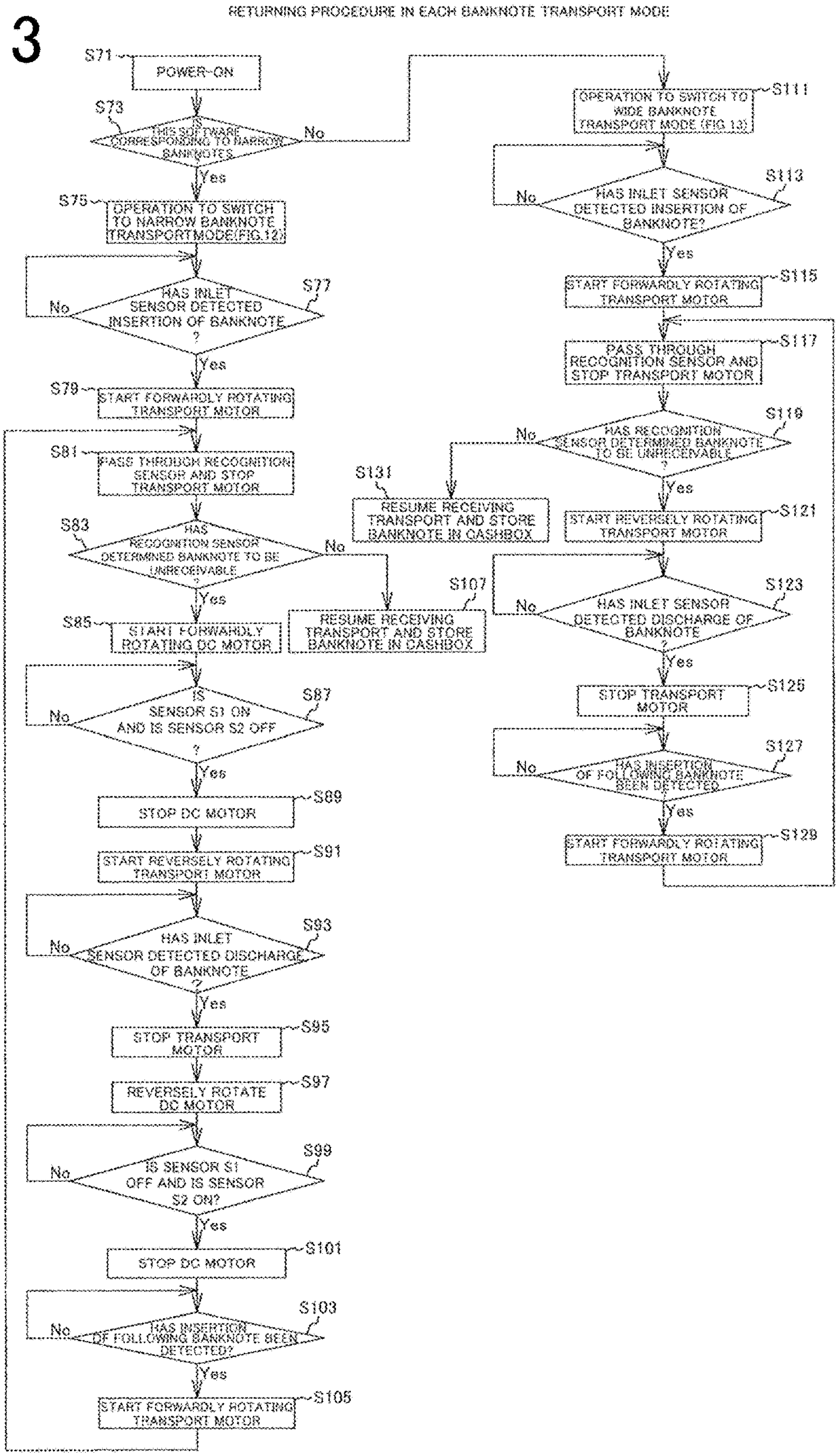
FIG. 13 is a flowchart related to a returning operation in each transport mode.

Switching between the transport modes, and a returning operation in each transport mode are explained next with reference also to a flowchart of FIG. 13. An operation of the transport guides to prevent occurrence of jam at the time of returning transport in the narrow banknote transport mode is characteristic.

The banknote transport device 1 of the present invention switches the banknote transport mode by switching software to be used according to the destination countries. As a result, widthwise shifting and skew correction can be performed while each of banknotes with different width dimensions is stably transported. That is, for example, the banknote transport device is used being switched to the narrow banknote transport mode when a narrow banknote having the maximum width dimension less than 72 mm is to be transported, and is used being switched to the wide banknote transport mode when a wide banknote having the maximum width dimension not less than 72 mm and less than 86 mm is to be transported.

When a narrow banknote during receiving transport is to be returned, switching of the height position of the transport guides (switching from the guide parts 320 to the guide parts 330) is automatically performed by software control.

That is, in the narrow banknote transport mode, the narrow banknote guide parts 320 of the transport guides are positioned in the transport path space 10G as illustrated in FIGS. 6(*a*-1), 10(*a*) and other drawings. Therefore, widthwise shifting and skew correction can be performed in cooperation of the taper guide surfaces 325*b* and the flat guide surfaces 325*a* at the time of transport of a narrow banknote in the receiving direction.

Upon power-on, whether the software corresponding to narrow banknotes is set is checked (Steps S71 and S73). When the software corresponding to narrow banknotes is set, the operation to switch to the narrow banknote transport mode described with reference to FIG. 12 is performed (Step S75). When the inlet sensor 15 detects insertion of a banknote in this state (Step S77 YES), the control unit starts forwardly rotating the transport motor (Step S79).

When the banknote has passed the recognition sensor 17, the transport motor is temporarily stopped (Step S81) to wait a determination by the recognition sensor as to whether the banknote is receivable (Step S83).

When the recognition sensor 17 determines that the banknote is unreceivable, the DC motor 450 is caused to start forwardly rotating (Step S83 YES and Step S85), the transport guides are switched to the wide banknote transport mode after Step S87, and an operation to return the banknote is sequentially performed.

When the recognition sensor 17 determines that the narrow banknote is unreceivable at Step S83 after the rear end of the narrow banknote passes the transport guides 310, the control unit 200 reversely rotates the friction transport device 20 to start returning, and stops the transport motor 60 after completion of the returning. However, a risk that the banknote to be returned is caught on the inner back surface 325 and causes jam if the narrow banknote guide parts 320 are positioned in the transport path space 10G at the time of the returning has been pointed out.

Accordingly, when a narrow banknote determined by the recognition sensor to be unreceivable is to be reversely transported and returned to the inlet 10*a*, the DC motor 450 is forwardly rotated at Step S85 to move the transport guides from the most lowered position in FIG. 10(*a*) to the most lifted position in FIG. 10(*e*). That is, on a condition of a state in which the first sensor S1 is ON and the second sensor S2 is OFF at the next Step S87, the control unit 200 stops the DC motor and subsequently starts reversely rotating the friction transport device 20 (the transport motor 60) (Steps S89 and S91). That is, completion of movement of the transport guides to the most lifted position is determined by a state in which the first sensor S1 is ON and the second sensor S2 is OFF. Since the wide banknote guide parts 330 are positioned in the transport path space 10G in FIG. 10(*e*), a narrow banknote that is transported to be returned by start of the reverse rotation of the friction transport device passes without being caught on the wide banknote guide parts, and is returned to the inlet 10*a*. That is, the transport motor is stopped at a time when the friction transport device 20 is started to reversely rotate and the inlet sensor 15 has detected paper discharge (Steps S91 to S95).

Subsequently, the control unit 200 starts forwardly rotating the DC motor for return to the narrow banknote transport mode, and determines that switching to the narrow banknote transport mode is completed when a state in which the first sensor S1 is OFF and the second sensor S2 is ON is established (Step S97 and Step S99 YES).

When insertion of a following narrow banknote is subsequently detected by the inlet sensor 15, the friction transport device is started to forwardly rotate to start receiving transport (Step S103 YES and Step S105).

When the recognition sensor determines at Step S83 that the banknote is receivable, the receiving transport is resumed to store the banknote in the cashbox (Step S107).

In a case in which a banknote that has been received as a narrow banknote is found to be returned at a stage when a part of the banknote is positioned in the narrow banknote guide parts 320, the banknote is returned to the inlet 10*a* while the receiving transport by the friction transport device is temporarily stopped and is switched to reverse transport and the narrow banknote guide parts are kept in the transport path space 10G. This is because the banknote may be torn if the transport guides are lowered (or lifted) while the banknote is positioned in the narrow banknote guide parts. Furthermore, the probability of occurrence of jam is lower when the reverse transport is performed in a state in which a banknote remains in the narrow banknote guide parts relative to a case in which the reverse transport is performed after the banknote rear end has passed the narrow banknote guide parts 320.

The case in which a narrow banknote is found to be returned at a stage when a part of the banknote is positioned in the narrow banknote guide parts 320 is, for example, a case in which it is determined that this is clearly not a banknote without performing recognition, such as a case in which the banknote is abnormally long or short. In this case, when the banknote is returned early without being transported to the downstream side of the recognition sensor, a risk of occurrence of jam on the downstream side is advantageously decreased.

Next, when the determination result at Step S73 is NO, that is, when the software corresponding to narrow banknotes is not set at the time of power-on, that is, when the software corresponding to wide banknotes is set, an operation to switch to the wide banknote transport mode is performed at Step S111. In the wide banknote transport mode, the transport operation is performed while the wide banknote guide parts 330 of the transport guides are kept positioned in the transport path space 10G not only at the time of receiving transport but also at the time of returning transport as illustrated in FIG. 6(*b*-2). This is because there is no risk that a banknote is caught on the inner back surfaces 335 of the wide banknote guide parts 330 at the time of returning.

When the inlet sensor 15 detects insertion of a banknote in a state in which it is determined at Step S111 that the transport mode is the wide banknote transport mode (the wide banknote guide parts are in the transport path space) (Step S113 YES), the friction transport device 20 (the transport motor 60) is started to forwardly rotate (step S115). When the banknote rear end has passed the recognition sensor 17, the transport motor is temporarily stopped (Step S117). When the recognition sensor determines that the wide banknote is unreceivable during the receiving transport, the friction transport device is stopped and reverse rotation is started (Step S119 YES and Step S121). When the inlet sensor 15 detects discharge of the banknote, the friction transport device is stopped (Step S123 YES and Step S125). When insertion of the following banknote is subsequently detected, the friction transport device is forwardly rotated to resume the receiving transport (Step S127 YES and Step S129).

When the recognition sensor 17 determines at Step S119 that the banknote is receivable, the receiving transport is continued to store the banknote in the cashbox (Step S131).

As described above, in the present invention, mode switching between the narrow banknote transport mode and the wide banknote transport mode is realized under control with software by lifting and lowering a pair of transport guides provided on a wide transport path that enables transport of a wide banknote. Accordingly, it is unnecessary to prepare plural types of devices including transport paths that are different in the width according to the sizes of the short edge of a banknote. That is, conventional two types of models can be integrated to one type without executing complicated software control.

Since a banknote can be widthwise shifted while being transported without interrupting transport of the banknote, the processing speed per banknote is not decreased. Furthermore, a risk of jam at the time of returning a narrow banknote can be reduced.

Since the inertia absorption mechanism is provided, the transport guides that operate to lift and lower can be stopped accurately and without a delay when the transport guides are stopped at each of the protruded position and the retracted position while damages on the drive transmission mechanism or the DC motor caused by inertia moment occurring at the time of stopping the DC motor when the DC motor is driven to lift or lower the transport guides are eliminated. That is, accurate and stable stop and drive resume can be realized similarly in drive using a stepping motor while the cost is greatly reduced by use of the DC motor.

[Operation of Friction Transport Device]

FIG. 14 is a front view of relevant parts of the friction transport device, and FIGS. 15(*a*) and 15(*b*) are perspective views of the relevant parts of the friction transport device. This operation is explained with reference also to FIG. 3.

As described above, the friction transport device 2 generally includes the drive-side unit 20 that transmits the transport driving force to one surface of a banknote P transported on the banknote transport path 10, the drive motor (the transport motor) 60, the driven roller 102 (the driven-side unit 100) that rotates in a driven manner being in contact with the other surface of the banknote, the transport grip adjustment mechanism GA that can change the transport grip between the drive roller 25 and the banknote, and the control unit 200 that controls various control targets.

A minimum required condition for the friction transport device applied to the banknote transport device 1 according to the present invention is that the transport grip is weak enough to enable widthwise shifting while a banknote is transported at the time of receiving. A friction transport device of any configuration may be applied when this condition is met.

The drive-side unit 20 includes one drive roller 25 that is supported to be rotatable on a shaft part 22 extending in a direction orthogonal to (intersecting with) the normal banknote transport direction, a rocking arm 30 that pivotally supports, at one portion, the shaft part 22 supporting the drive roller and that has the other portion pivotally supported by a rocking shaft 50*a* so as to change the distance from the driven roller 102 to change the transport grip by rocking the drive roller, an elastic biasing member 40 that elastically biases the drive roller toward the driven roller 102 via the rocking arm, and the drive transmission mechanism DM (FIG. 3) that transmits the driving force from the drive motor 60 to the drive roller.

The transport grip adjustment mechanism GA is configured to separate the drive roller from the driven roller (the banknote transport surface 11) to decrease the transport grip against the elastic biasing force of the elastic biasing member 40 when an external force (a rection force from a sidewall, or the like) above a predetermined value in a direction other than the normal transport direction is applied to a banknote transported on the transport path 10 by forward rotation of the drive motor 60 (when transport load applied from the banknote to the drive roller changes to exceed a predetermined value). The drive roller changes the distance from the driven roller by rocking of the rocking arm 30 on the rocking shaft 50*a* with the distance of a radius r kept therefrom.

The driving force from the drive motor 60 is transmitted to an input gear 50 via the drive transmission members 62 such as the intermediate gear group, the belt, and the pulley, and the input gear 50 meshes with an output gear 52 coaxially integrated with the drive roller, to rotate the drive roller. The rocking arm 30 includes a configuration capable of rocking on the rocking shaft 50*a* being the rotation axis of the input gear 50 in the upper and lower directions (the forward rotation direction and the reverse rotation direction). The rocking arm 30 and the input gear 50 are in a relation of relative rotation.

When the transport load applied from a banknote to the drive roller is not above the predetermined value during transport of the banknote in the receiving direction, the circumferential speeds of the input gear 50 and the output gear 52 are kept equal. Therefore, the rocking arm maintains a state (an initial state, an initial position) pressed by the elastic biasing member 40 against a stopper member 55 and does not rock. When the transport load from a banknote applied to the drive roller 25 exceeds the predetermined value, the circumferential speed of the output gear becomes lower than that of the input gear and the rocking arm accordingly rocks by the difference in the circumferential speed (the rocking arm moves away from the initial position).

The drive transmission members 62 that transmit the driving force from the drive motor 60, the input gear 50 that rotates upon receiving the driving force transmitted from the drive transmission members, and the output gear 52 that is coaxially integrated with the drive roller 25 and that meshes with the input gear to receive transmission of the driving force constitute the drive transmission mechanism DM.

The rocking arm 30, the elastic biasing member 40, the drive transmission mechanism DM, and the stopper member 55 as means for defining an upper limit position (a forward rotation limit position) of the rocking arm constitute the transport grip adjustment mechanism GA.

The transport grip adjustment mechanism GA is configured to change the frictional force (hereinafter, "transport grip") between the drive roller 25 and a banknote P according to the value of load from the banknote passing through between the drive roller and the driven roller, and the direction of the load (the transport status).

That is, the transport path 10 includes sidewalls and the transport guides 310, and the transport grip adjustment mechanism GA operates to decrease the transport grip by moving the drive roller 25 in a direction away from the driven roller 102 when a banknote is brought to contact with a sidewall or a transport guide and is subject to an external force exceeding the predetermined value in a direction other than the normal banknote transport direction in the course of transport of the banknote in the receiving direction along the transport path.

The value of the decreased transport grip is a value that enables a change to a direction to cancel the external force from the sidewall in cooperation with the sidewall by eliminating or reducing constraint on the banknote by the nip part between the rollers 25 and 102. That is, the value of the decreased transport grip is a value that can correct a banknote in a transport failure state to have a transport attitude parallel to the normal banknote transport direction, or that enables sideslip (including rotation and slide in other various directions) of the banknote between the drive roller and the driven roller so as to be moved in the width direction with respect to the normal transport position.

Application Example of Embodiment

First Application Example

Figure 16:
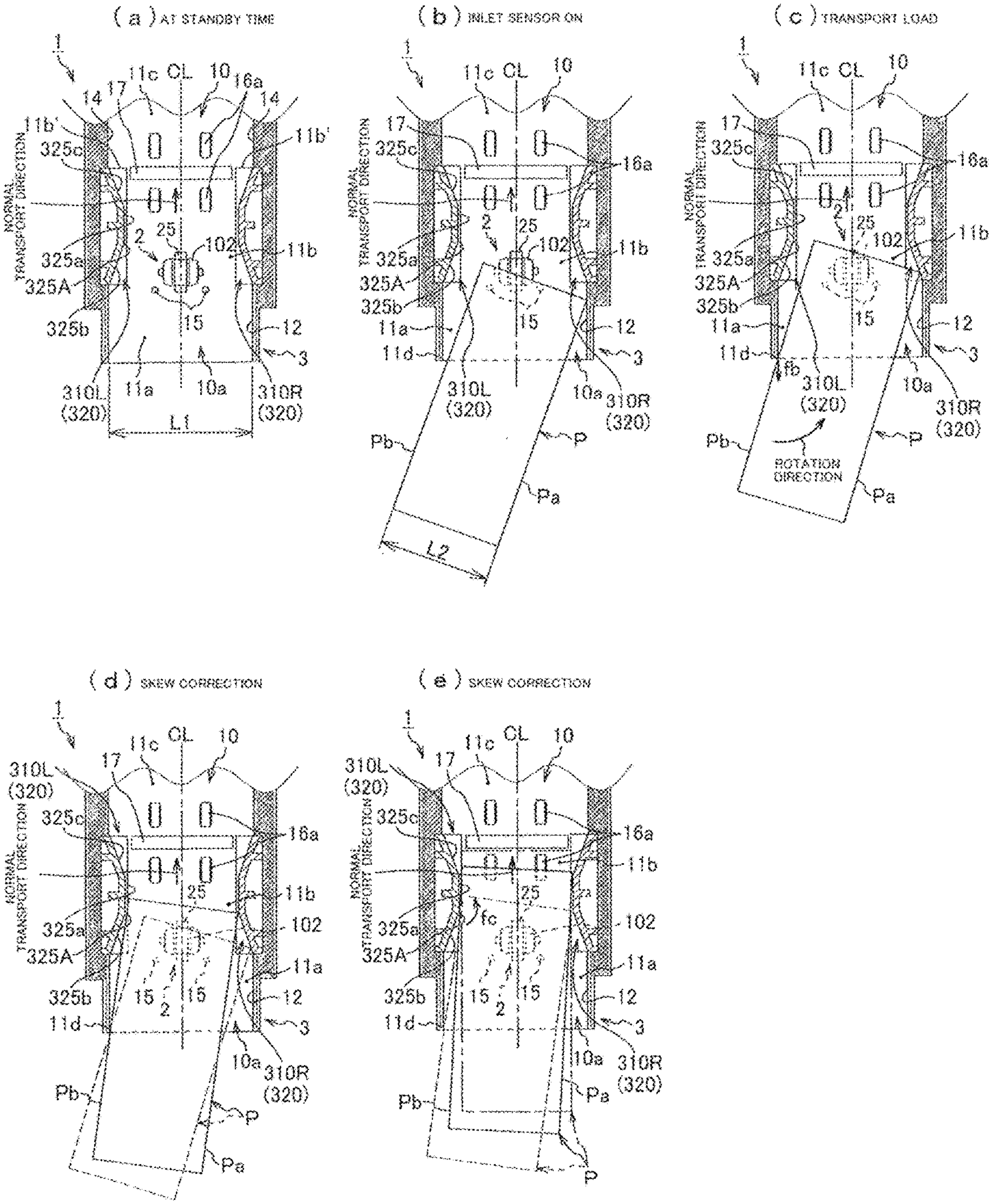
FIGS. 16(*a*) to 16(*e*) are plan views of relevant parts illustrating a skew correcting procedure in a case in which the transport guides of the present invention and a drive mechanism thereof are applied to a banknote transport path.

FIGS. 16(*a*) to 16(*e*) are plan views of relevant parts illustrating a skew correcting procedure in a case in which the transport guides (the narrow banknote guide parts 320) of the present invention and a drive mechanism thereof are applied to a banknote transport path that is wide and constant in the width. FIGS. 16(*a*) to 16(*e*) illustrate a state in which the narrow banknote guide parts 320 are located at the home position.

In the example of FIGS. 16, a width dimension L1 of the banknote transport path 10 is 86 mm and a width dimension L2 of a banknote to be transported is 66 mm.

By application of the transport guides 310 and the friction transport device 2 to the banknote transport path 10, a transport state in which the position, angle, and attitude of a banknote inserted in a skewed manner are corrected to be aligned with one of the sidewalls (or the central axis CL) can be obtained.

When a banknote P is inserted from the inlet 10*a* to the friction transport device 2 in a standby state in FIG. 16(*a*), the inlet sensor 15 detects the insertion and is turned ON and driving of the drive roller 25 in the forward rotation direction is started by the drive motor 60 as illustrated in FIG. 16(*b*). When the inserted banknote is skewed by a predetermined angle in the clockwise direction as illustrated in FIGS. 16(*b*) and 16(*c*), a left side end edge Pb of the banknote P is brought to contact with an inlet side end part 11*d* and is subject to a rection force fb. Upon receiving of the reaction force fb from the inlet side end part 11*d* on the left side end edge Pb of the banknote, the transport grip adjustment mechanism GA is actuated to weaken the transport grip between the drive roller and the banknote to sideslip the banknote. While the banknote P having started sideslipping rotates in the counterclockwise direction on a contact part between the left side end edge Pb of the banknote and the inlet side end part 11*d* as illustrated in FIGS. 16(*c*), 16(*d*), and 16(*e*), the skew correcting operation can be efficiently performed in cooperation with the left and right transport guides 310L and 310R.

That is, in FIG. 16(*d*), the banknote P advances while bringing a portion of the left side end edge Pb of the banknote P near the leading end to contact with the taper guide surface 325*b* and a corner portion 325A of the flat guide surface 325*a* of the left transport guide 310L, and sequentially bringing a right side end edge Pa to contact with the taper guide surface 325*b* and the flat guide surface 325*a* of the right transport guide 310R and correcting the attitude.

In the state in FIG. 16(*e*), since the banknote advances while rotating in the counterclockwise direction upon receiving a force in a rotation direction indicated by an arrow fc due to a reaction force generated at the contact point between the corner portion 325A and the left side end edge Pb of the banknote, the transport attitude can be corrected. The corrected banknote P is transported to the inner back part in a straight advancing attitude with the side end edges Pa and Pb parallelly along the flat guides 325*a* of the transport guides as indicated by a dashed-dotted line in FIG. 16(*e*).

Second Application Example

Figure 17:
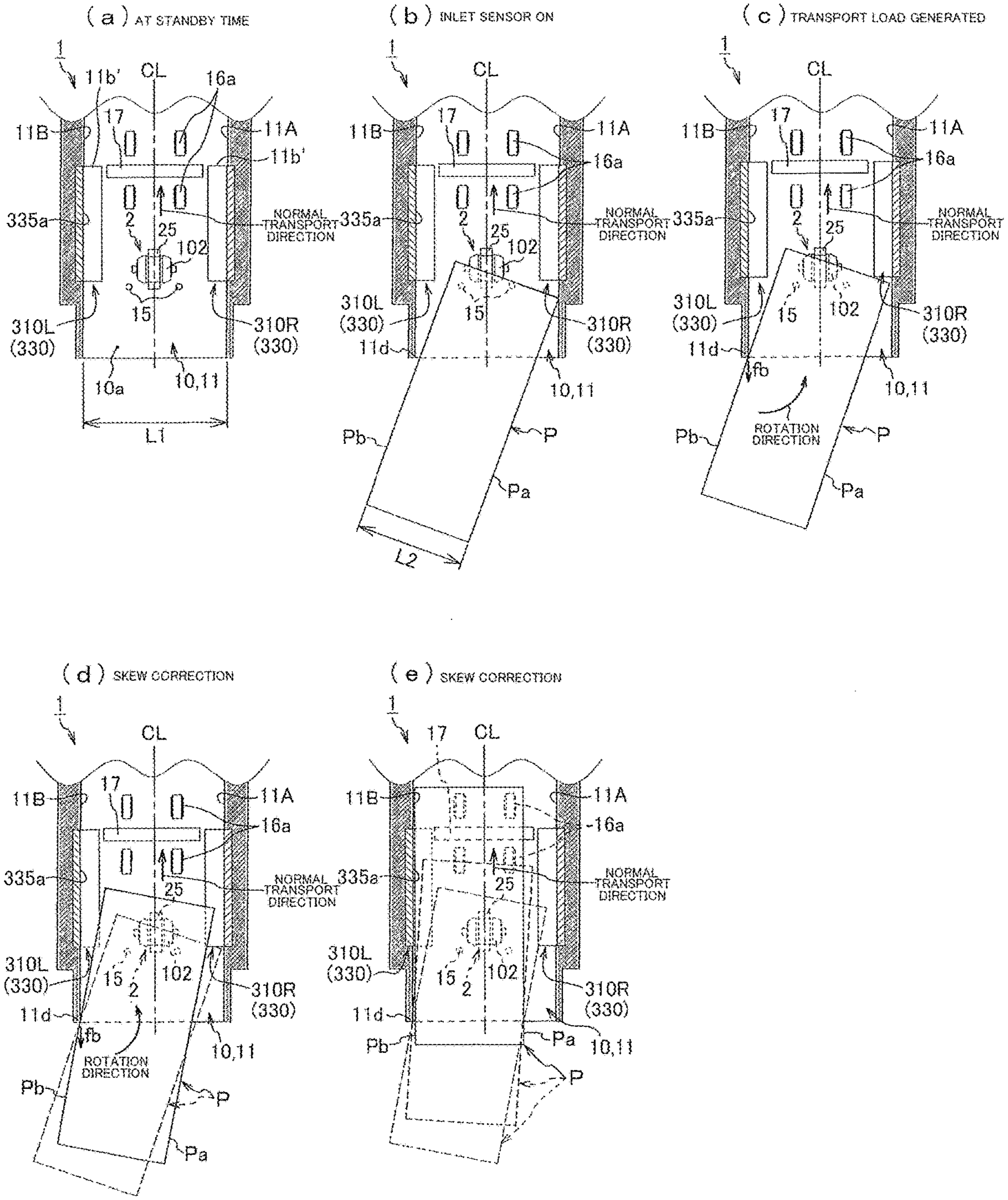
FIGS. 17(*a*) to 17(*e*) are plan views of relevant parts illustrating another skew correcting procedure in a case in which the transport guides of the present invention and a drive mechanism thereof are applied to a banknote transport path.

FIGS. 17(*a*) to 17(*e*) are plan views of relevant parts illustrating another skew correcting procedure in a case in which the transport guides (the wide banknote guide parts 330) of the present invention and a drive mechanism thereof are applied to a banknote transport path that is wide and constant in the width.

In the example in FIGS. 17, the width dimension L1 of the banknote transport path 10 is 86 mm and the width dimension L2 of a banknote to be transported is 66 mm.

FIG. 17 illustrate a state in which the wide banknote guide parts 330 are located at the home position. In this state, the inner back surfaces 335 (the flat guide surfaces 335*a*) of the wide banknote guide parts 330 are flush with (have no difference in the level from) sidewalls 11A and 11B of the banknote transport path 10.

By application of the transport guides 310 and the friction transport device 2 to the banknote transport path 10, a transport state in which the position, angle, and attitude of a banknote inserted in a skewed manner are corrected to be aligned with one of the sidewalls 11A and 11B can be obtained.

When a banknote P is inserted from the inlet 10*a* to the friction transport device 2 in a standby state in FIG. 17(*a*), the inlet sensor 15 detects the insertion and is turned ON and driving of the drive roller 25 in the forward rotation direction is started by the drive motor 60 as illustrated in FIG. 17(*b*). When the inserted banknote is skewed by a predetermined angle in the clockwise direction as illustrated in FIG. 17(*b*), the left side end edge Pb of the banknote P is brought to contact with the inlet side end part 11*d* and is subject to the reaction force fb. Upon receiving of the reaction force fb from the inlet side end part 11*d* on the left side end edge Pb of the banknote, the transport grip adjustment mechanism GA is actuated to weaken the transport grip between the drive roller and the banknote, and can efficiently perform the skew correcting operation of transporting the banknote while sideslipping the banknote and rotating the banknote in the counterclockwise direction on a contact part between the left side end edge of the banknote and the inlet side end part.

In the present example, the corrected banknote P is transported to the inner back part in a state in which the left side end edge Pb of the banknote is aligned with the left sidewall 11B of the transport path 10 and in a straight advancing attitude as indicated by a solid line in FIG. 17(*e*).

In this skew correcting process, the inner back faces 335 (the flat guide surfaces 335*a*) of the wide banknote guide parts 330 are not protruded from the both sidewalls 11A and 11B of the banknote transport path 10 and are flush therewith. Therefore, smooth skew correction can be performed to banknotes with various widths.

[Summary of Configurations, Actions, and Effects of Present Invention]

A transport guide drive mechanism 300 according to a first invention includes: a transport surface 11 that guides one surface of a paper sheet P; transport guides 310 that are arranged along both side edges of the transport surface in a width direction to oppose each other and that respectively guide both side edges of the paper sheet to be transported; an advancing/retreating mechanism 350 that causes the transport guides to integrally (synchronously) advance and retreat (protrude and retract) in a predetermined direction; stoppers 440 each of which defines a protruded position where the transport guides 310 are most protruded from the transport surface 11 and a retracted position retracted from the protruded position toward the transport surface respectively; and a DC motor 450 that drives the advancing/retreating mechanism 350.

The advancing/retreating mechanism 350 includes a gear mechanism (drive transmission mechanism) 360 that is driven by the DC motor to cause each of the transport guides to advance and retreat between the protruded position and the retracted position, and an inertia absorption mechanism 400 that absorbs and reduces inertia moment of the DC motor transmitted from an output shaft of the DC motor to the gear mechanism after the DC motor stops (when the DC motor stops) at a timing the transport guides are stopped at each of the protruded position and the retracted position by the stoppers.

According to the present invention, paper sheets with different width dimensions can be stably transported by one model including a wide transport path that is applicable in common to narrow paper sheets and wide paper sheets, and movable transport guides while widthwise shifting and skew correction of the paper sheets are performed. This is because preparing two types of banknote transport devices that have no structural differences other than the difference in the width of the transport path, and manufacturing and shipping one of the types according to orders is apparently disadvantageous in terms of increase in the manufacturing cost, inventory management cost, and the like. According to the returning procedure of the present invention, occurrence of jam at the transport guides, which is likely to occur at the time of returning a narrow paper sheet can also be prevented.

A stable protruding and retracting operation of the transport guides is realized by the DC motor that is significantly lower in the cost than a stepping motor. Various troubles caused by continuation of the output of the DC motor due to inertia after interruption of power, which is a drawback of the DC motor, are resolved by the inertia absorption mechanism. The inertia absorption mechanism has a simple configuration in which an elastic member is arranged between each of the drive-side gears and the associated intermediate gear.

In the transport guide drive mechanism 300 according to a second invention, the gear mechanism 360 includes rack gears 316 each provided on an associated one of the transport guides 310, pinion gears 370 that each mesh with an associated one of the rack gears to be rotationally driven to cause the transport guides to simultaneously advance and retreat, two drive-side gears 380 that are each supported at (fixed to) a shaft center by a drive shaft 375 arranged in parallel to the width direction of the transport path 10 and are rotationally driven by a driving force from the DC motor 450, and intermediate gears 390 that are each supported at a shaft center by the drive shaft coaxially along one side surface of each of the drive-side gears and to be relatively rotatable with respect to the associated drive-side gear and that each always mesh with an associated one of the pinion gears.

The inertia absorption mechanism 400 includes elastic members 405 that are each arranged between the associated drive-side gear 380 and the associated intermediate gear 390, and that absorb and reduce inertia moment generated when the DC motor stops due to reaching of the transport guides 310 to the protruded position or the retracted position and stop thereof.

At a time when the transport guides 310 lift or lower to abut the stoppers 440, the sensors S1 and S2 that detect the home position are actuated and the DC motor 450 is stopped. However, the DC motor does not immediately stop and the inertia is generated. In normal states, the gears constituting the drive transmission mechanism 360 are locked by the inertia. However, in the present invention, the elastic members 405 are actuated and the drive-side gears 380 compress the elastic members while rotating with respect to the intermediate gears 390 that are stopped. The compressed amount of the elastic members corresponds to the amount of absorbed inertia (inertia moment of the motor).

Therefore, the transport guides can be immobilized at each of the protruded position and the retracted position without a delay and rattling at the time of being brought to contact with the stoppers.

In the transport guide drive mechanism 300 according to a third invention, the transport guides 310 include narrow paper sheet guide parts 320 that advance and retreat in a direction orthogonal to the transport surface 11 and that are arranged to oppose each other at a distance appropriate to guide both side edges of a narrow paper sheet with a small width dimension, and wide paper sheet guide parts 330 that are adjacently arranged above or below the narrow paper sheet guide parts and that are arranged to oppose each other at a distance appropriate to guide both side edges of a wide paper sheet with a large width dimension.

With control of the advancing/retreating mechanism 350 driven by the DC motor, the transport guides arranged on the wide transport surface are enabled to advance and retreat to selectively stop each of the narrow paper sheet guide parts and the wide paper sheet guide parts at the home position. The transport guides are always installed and the need of a burdensome operation, such as previously retrofitting the transport guides according to the size of banknotes of a country as a shipment destination of the paper sheet transport device or the paper sheet handling device is eliminated.

A paper sheet transport device 1 according to a fourth invention includes the transport guide drive mechanism 300, a friction transport device 2 that, when a paper sheet is subject to a reaction force in a direction different from a normal transport direction in a course of transporting the paper sheet along the transport surface 11, transports the paper sheet while reducing a transport grip during a period in which the paper sheet is subject to the reaction force; and a control unit 200.

As the friction transport device, any configuration is applicable when the transport grip is weak enough to enable widthwise shifting of a banknote at the time of receiving while the banknote is transported.

In a method for controlling the paper sheet transport device 1 according to a fifth invention, the control unit 200 stops the narrow paper sheet guide parts 320 at a home position where both side edges of a narrow paper sheet transported along the transport surface 11 can be guided in a narrow paper sheet transport mode of transporting a narrow paper sheet, and stops the wide paper sheet guide parts 330 at a home position where both side edges of a wide paper sheet transported along the transport surface can be guided in a wide paper sheet transport mode of transporting a wide paper sheet. When a narrow paper sheet having once passed the transport guides is to be returned in the narrow paper sheet transport mode, a returning operation is performed after the advancing/retreating mechanism is actuated to move the wide paper sheet guide parts to the home position.

According to this control method, jam that is likely to occur when a narrow paper sheet received and transported using the narrow paper sheet guide parts is returned can be effectively prevented by a simple operation.

With adoption of the transport guide transport mechanism of the present invention, the jamming rate at the time of returning can be decreased.

A paper sheet handling device according to a sixth invention includes the paper sheet transport device 1.

REFERENCE SIGNS LIST

1 . . . banknote (paper sheet) transport device, 2 . . . friction transport device, 3 . . . lower unit, 3*a* . . . shaft part, 4 . . . upper unit, 10 . . . banknote (paper sheet) transport path, 10G . . . paper sheet transport space, 11 . . . banknote (paper sheet) transport surface, 11*a* . . . inlet-side transport surface, 11*b* . . . intermediate transport surface, 11*c* . . . back transport surface, 15 . . . paper sheet detection sensor (inlet sensor), 16*a*, 16*b* . . . transport roller, 17 . . . recognition sensor, 20 . . . drive-side unit, 22 . . . shaft part, 25 . . . drive roller, 30 . . . rocking arm, 32 . . . arm member, 35 . . . gear support member, 40 . . . elastic biasing member, 50 . . . input gear, 50*a* . . . rocking shaft, 52 . . . output gear, 55 . . . stopper member, 60 . . . drive motor, 62 . . . drive transmission member, 100 . . . driven-side unit, 102 . . . driven roller, 103 . . . holding member, 106 . . . shaft, 107 . . . elastic member, 200 . . . control unit, 300 . . . transport guide drive mechanism, 310 . . . transport guide, 310L . . . transport guide, 310R . . . transport guide, 312 . . . transport guide body, 314 . . . leg part, 316 . . . rack gear, 320 . . . narrow paper sheet guide part, 321 . . . upper wall, 322 . . . intermediate wall, 325 . . . inner back surface, 325*a* . . . flat guide surface, 325*b*, 325*c* . . . taper guide surface, 330 . . . wide paper sheet guide part, 331 . . . lower wall, 335 . . . inner back surface, 335*a* . . . flat guide surface, 350 . . . advancing/retreating mechanism, 360 . . . gear mechanism, 370 . . . pinion gears, 375 . . . drive shaft, 380 . . . drive gear, 381 . . . recessed portion, 383*a* . . . pressing piece, 383*b* . . . pressing piece, 390 . . . intermediate gear, 391*a* . . . pressed piece, 400 . . . inertia absorption mechanism, 405 . . . elastic member, 440*a* . . . lowering stopper, 440*b* . . . lifting stopper, 450 . . . DC motor.

The invention claimed is:

1. A transport guide drive mechanism comprising:

a transport surface that guides one surface of a paper sheet; transport guides that are arranged along both side edges of the transport surface in a width direction to oppose each other and that respectively guide both side edges of the paper sheet to be transported; an advancing/retreating mechanism that causes the transport guides to synchronously advance and retreat in a predetermined direction; stoppers each of which defines a protruded position where the transport guides are most protruded from the transport surface and a retracted position retracted from the protruded position toward the transport surface respectively; and a DC motor that drives the advancing/retreating mechanism, wherein the advancing/retreating mechanism includes a gear mechanism that is driven by the DC motor to cause each of the transport guides to advance and retreat between the protruded position and the retracted position, and an inertia absorption mechanism that absorbs and reduces inertia moment of the DC motor transmitted from an output shaft of the DC motor to the gear mechanism when the DC motor stops at a timing the transport guides are stopped at each of the protruded position and the retracted position by the stoppers, wherein the transport guides include first paper sheet guide parts that advance and retreat in a direction orthogonal to the transport surface and that are arranged to oppose each other at a distance appropriate to guide both side edges of a first paper sheet with a first width dimension, and second paper sheet guide parts that are adjacently arranged above or below the first paper sheet guide parts and that are arranged to oppose each other at a distance appropriate to guide both side edges of a second paper sheet with a second width dimension, wherein the second width dimension is larger than the first width dimension, and wherein the first paper sheet guide parts and the second paper sheet guide parts advance or retreat integrally and in a height direction.

2. The transport guide drive mechanism according to claim 1, wherein the gear mechanism includes rack gears each provided on an associated one of the transport guides, pinion gears each of which meshes with an associated one of the rack gears to be rotationally driven to cause the transport guides to simultaneously advance and retreat, two drive-side gears that are each supported at a shaft center by a drive shaft arranged in parallel to the width direction of the transport surface and are rotationally driven by a driving force from the DC motor, and intermediate gears that are each supported at a shaft center by the drive shaft coaxially along one side surface of each of the drive-side gears and to be relatively rotatable with respect to the associated drive-side gear and that each always mesh with an associated one of the pinion gears, and the inertia absorption mechanism includes elastic members that are each arranged between the associated drive-side gear and the associated intermediate gear, and that absorb and reduce inertia moment generated when the DC motor stops due to reaching of the transport guides to the protruded position or the retracted position and stop thereof.

3. A paper sheet transport device comprising:

the transport guide drive mechanism according to claim 1;

a friction transport device that, when the paper sheet is subject to a reaction force in a direction different from a normal transport direction in a course of transporting the paper sheet along the transport surface, transports the paper sheet while reducing a transport grip during a period in which the paper sheet is subject to the reaction force; and a control unit.

4. A method for controlling the paper sheet transport device according to claim 3, wherein the control unit stops the first paper sheet guide parts at a home position where both side edges of a first paper sheet transported along the transport surface can be guided in a first paper sheet transport mode of transporting a first paper sheet, the control unit stops the second paper sheet guide parts at a home position where both side edges of a second paper sheet transported along the transport surface can be guided in a second paper sheet transport mode of transporting a second paper sheet, and when the first paper sheet having once passed the transport guides is to be returned in the first paper sheet transport mode, a returning operation is performed after the advancing/retreating mechanism is actuated to move the second paper sheet guide parts to the home position.

5. A paper sheet handling device comprising the paper sheet transport device according to claim 3.

6. A paper sheet transport device comprising:

the transport guide drive mechanism according to claim 2;

a friction transport device that, when the paper sheet is subject to a reaction force in a direction different from a normal transport direction in a course of transporting the paper sheet along the transport surface, transports the paper sheet while reducing a transport grip during a period in which the paper sheet is subject to the reaction force; and a control unit.

7. A paper sheet transport device comprising:

the transport guide drive mechanism according to claim 1;

a friction transport device that, when the paper sheet is subject to a reaction force in a direction different from a normal transport direction in a course of transporting the paper sheet along the transport surface, transports the paper sheet while reducing a transport grip during a period in which the paper sheet is subject to the reaction force; and a control unit.

8. A method for controlling the paper sheet transport device according to claim 6, wherein the control unit stops the first paper sheet guide parts at a home position where both side edges of a first paper sheet transported along the transport surface can be guided in a first paper sheet transport mode of transporting a first paper sheet, the control unit stops the second paper sheet guide parts at a home position where both side edges of a second paper sheet transported along the transport surface can be guided in a second paper sheet transport mode of transporting a second paper sheet, and when the first paper sheet having once passed the transport guides is to be returned in the first paper sheet transport mode, a returning operation is performed after the advancing/retreating mechanism is actuated to move the second paper sheet guide parts to the home position.

9. A method for controlling the paper sheet transport device according to claim 7, wherein the control unit stops the first paper sheet guide parts at a home position where both side edges of a first paper sheet transported along the transport surface can be guided in a first paper sheet transport mode of transporting a first paper sheet, the control unit stops the second paper sheet guide parts at a home position where both side edges of a second paper sheet transported along the transport surface can be guided in a second paper sheet transport mode of transporting a second paper sheet, and when the first paper sheet having once passed the transport guides is to be returned in the first paper sheet transport mode, a returning operation is performed after the advancing/retreating mechanism is actuated to move the second paper sheet guide parts to the home position.

10. A paper sheet handling device comprising the paper sheet transport device according to claim 6.

11. A paper sheet handling device comprising the paper sheet transport device according to claim 7.

* * * * *